US011396230B2

(12) United States Patent
Rike

(10) Patent No.: US 11,396,230 B2
(45) Date of Patent: *Jul. 26, 2022

(54) INTEGRATED FILL SYSTEM AND METHOD

(71) Applicant: WORTHINGTON INDUSTRIES, INC., Columbus, OH (US)

(72) Inventor: James B. Rike, Mooresville, IN (US)

(73) Assignee: WORTHINGTON INDUSTRIES, INC., Columbus, OH (US)

(*) Notice: Subject to any disclaimer, the term of this patent is extended or adjusted under 35 U.S.C. 154(b) by 30 days.

This patent is subject to a terminal disclaimer.

(21) Appl. No.: 17/088,725

(22) Filed: Nov. 4, 2020

(65) Prior Publication Data

US 2021/0046817 A1 Feb. 18, 2021

Related U.S. Application Data

(63) Continuation of application No. 16/180,122, filed on Nov. 5, 2018, now Pat. No. 10,889,181.

(51) Int. Cl.
*B60K 15/07* (2006.01)
*B60K 15/03* (2006.01)
*B60K 15/01* (2006.01)
*B60K 15/04* (2006.01)

(52) U.S. Cl.
CPC ........... *B60K 15/07* (2013.01); *B60K 15/013* (2013.01); *B60K 15/03006* (2013.01); *B60K 15/03177* (2013.01); *B60K 15/0406* (2013.01)

(58) Field of Classification Search
CPC .............. B60K 15/07; B60K 15/03006; B60K 15/03177; B60K 15/013; B60K 15/0406
See application file for complete search history.

(56) References Cited

U.S. PATENT DOCUMENTS

| 7,275,609 B2‡ | 10/2007 | Chernoff | B60G 3/18 180/65.1 |
|---|---|---|---|
| 9,908,406 B2‡ | 3/2018 | Rike | B60K 15/07 |
| 10,183,576 B2‡ | 1/2019 | Rike | B60K 15/07 |
| 10,889,181 B2* | 1/2021 | Rike | B60K 15/013 |
| 2017/0129330 A1‡ | 5/2017 | Sloan | A47B 87/0207 |
| 2020/0238822 A1* | 7/2020 | Milton et al. | B60K 15/07 |

\* cited by examiner
‡ imported from a related application

Primary Examiner — Kevin L Lee
(74) Attorney, Agent, or Firm — Tucker Ellis LLP

(57) ABSTRACT

An integrated fill system is provided for a vehicle. The integrated fill system can include a receptacle, a cap that mates with the receptacle, and a fill line that is in fluid communication between the receptacle and a container. The integrated fill system can further include a valve between an opening on an end of the container and an end of the fill line to allow one-way fluid communication for entry of compressed material into the container. The integrated fill system can further include a draw line on an opposite end of the container to maintain separate lines for filling and drawing compressed material into/from the container.

20 Claims, 30 Drawing Sheets

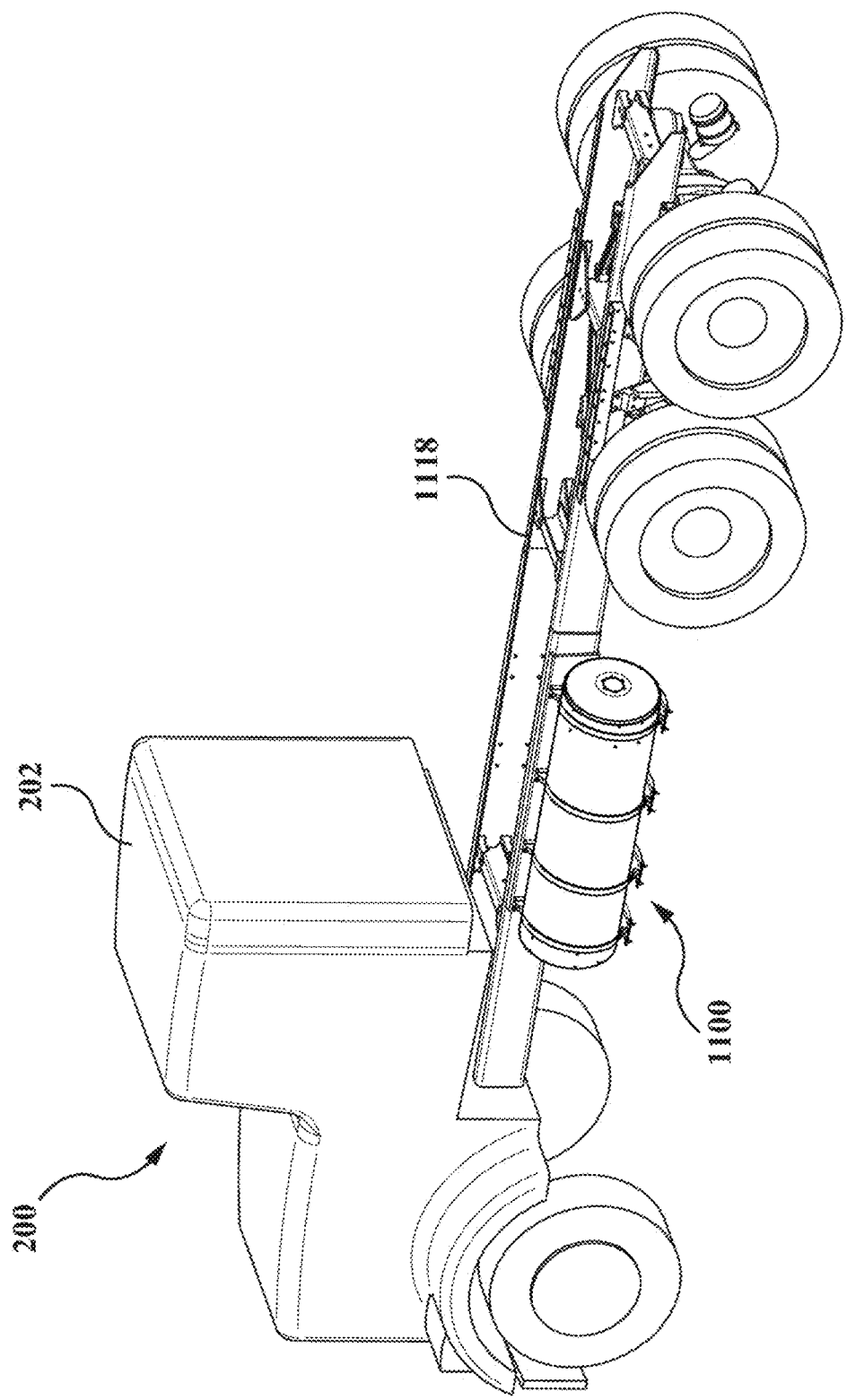

INTEGRATED FILL SYSTEM AND METHOD

CROSS-REFERENCE TO RELATED APPLICATION(S)

This application is a continuation of U.S. Non-provisional application Ser. No. 16/180,122, filed Nov. 5, 2018, now U.S. Pat. No. 10,889,181, and entitled "INTEGRATED FILL SYSTEM AND METHOD." The entirety of the aforementioned application is incorporated herein by reference.

BACKGROUND

Technical Field

Embodiments of the subject matter disclosed herein relate to a support structure having an integrated fill system for a container of a vehicle that utilizes an alternative fuel as a fuel source, wherein the vehicle can utilize a combustible fuel engine, a battery powered engine, or a combination thereof.

Discussion of Art

It may be desirable to have an alternative fuel system and method that differs from those systems and methods that are currently available.

BRIEF DESCRIPTION

In an embodiment, a support system for a vehicle is provided that includes at least the following: one or more bracket assemblies that is configured to support a container within a housing, the bracket assembly includes a coupling member that couples to a chassis of a vehicle and a member that supports a portion of the housing; the container houses a compressed gas, the container has a first end and a second end opposite thereto; a threaded male portion on the first end that is coupled to a female portion on a first neck mount, wherein the threaded male portion mates with the female portion; the second end inserted into a second neck mount to enable movement based on a pressure change or a temperature change; the housing releasably coupled to the member of the bracket assembly and the housing encases the container, the first neck mount, the second neck mount; a fill line having a first end and a second end, the first end is coupled to the first end of the container via a first valve, wherein the first valve is configured to allow flow of the compressed gas into the container; a first receptacle that is coupled to the second end of the fill line and positioned through the housing, the first receptacle is configured to receive at least one of the compressed gas or a nozzle that dispenses the compressed gas at a first rate of flow into the container; and a first cap that is configured to removeably mate with the first receptacle.

In an embodiment, a storage system for a vehicle is provided that includes at least the following: a housing having a first end and a second end opposite the first end and a thickness, the housing having a length between the first end and the second end; a container having a cylindrical shape is situated within the housing, the container houses a material, the container has a first end and a second end opposite thereto; a first neck mount configured to receive the neck, the first neck mount is coupled to a first inner plate positioned proximate to the first end of the housing; a second neck mount configured to receive the second end of the container, the second neck mount is coupled to a second inner plate positioned proximate to the second end of the housing; the housing is configured to be coupled to a frame of a vehicle such that the length of the housing is at least one of behind a cab of the vehicle or below a cab of the vehicle; a fill line having a first end and a second end, the first end is coupled to the first end of the container via a first valve, wherein the first valve is configured to allow flow of the compressed gas into the container; a first receptacle that is coupled to the second end of the fill line and positioned through the housing, the receptacle is configured to receive at least one of the compressed gas or a nozzle that dispenses the compressed gas at a first rate of flow; and a first cap that is configured to removeably mate with the first receptacle.

In an embodiment, a support system for a vehicle is provided that includes at least the following: a housing having a first end and a second end opposite the first end and a thickness, the housing having a length between the first end and the second end; a container having a cylindrical shape, the container houses a material, the container has a first end and a second end opposite thereto; a first neck mount configured to receive the neck, the first neck mount is coupled to a first inner plate positioned proximate to the first end of the housing; a second neck mount configured to receive the second end of the container, the second neck mount is coupled to a second inner plate positioned proximate to the second end of the housing; the housing configured to provide protection and enclose the container, the first neck mount, the first inner plate, the second neck mount, the second inner plate, and the truss assembly; one or more bracket assemblies, wherein each bracket assembly includes a coupling member that couples to a chassis of a vehicle and a member that is coupled or supports an exterior of the housing; a fill line having a first end and a second end, the first end is coupled to the first end of the container via a first valve, wherein the first valve is configured to allow flow of the compressed gas into the container; a first receptacle that is coupled to the second end of the fill line and positioned through the housing, the receptacle is configured to receive at least one of the compressed gas or a nozzle that dispenses the compressed gas at a first rate of flow into the container; and a first cap that is configured to removeably mate with the first receptacle; a second receptacle that is positioned through the housing, the second receptacle is configured to receive at least one of the compressed gas or a nozzle that dispenses the compressed gas at a second rate of flow into the container, wherein the first rate of flow is greater than the second rate of flow; and a second cap that is configured to removeably mate with the second receptacle.

These and other objects of this invention will be evident when viewed in light of the drawings, detailed description and appended claims.

BRIEF DESCRIPTION OF THE DRAWINGS

Reference is made to the accompanying drawings in which particular embodiments and further benefits of the provided subject matter are illustrated as described in more detail in the description below.

FIG. 33 is an illustration of a support system coupled to a chassis or frame of a vehicle.

DETAILED DESCRIPTION

Figure 1:
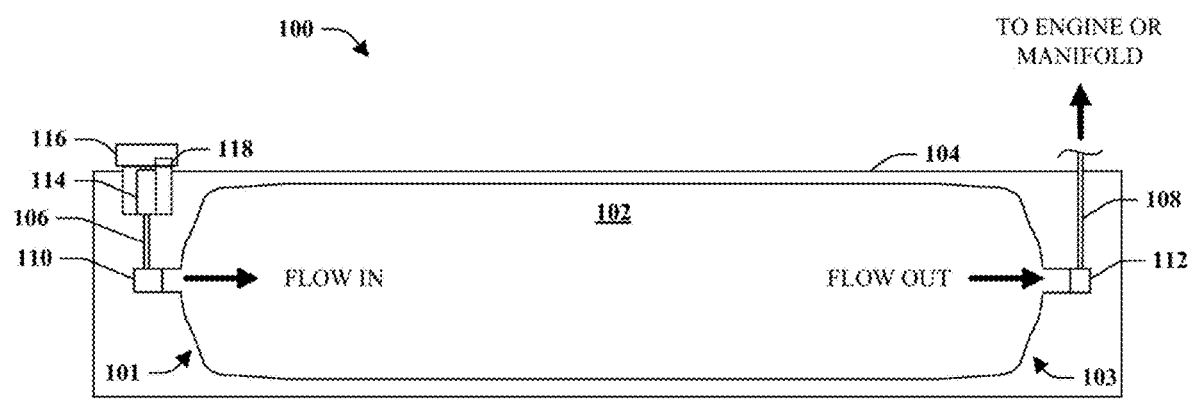
FIG. 1 is cross-sectional view of an integrated fill system that includes a housing that encases a container.

Embodiments of the provided subject matter relate to methods and systems for a support system having an integrated fill system for a container housing a material used as a fuel source for a vehicle. The integrated fill system can include a receptacle, a cap that mates with the receptacle, and a fill line that is in fluid communication between the receptacle and a container. The integrated fill system can further include a valve between an opening on an end of the container and an end of the fill line to allow one-way fluid communication for entry of compressed material into the container. The integrated fill system can further include a draw line on an opposite end of the container to maintain separate lines for filling and drawing compressed material into/from the container.

By way of example and not limitation, the integrated fill system can maintain a fill line separate from a draw line such that incoming material to be housed in the container is isolated to come in from the fill line and the outgoing material leaving the container is isolated to leave from the draw line. Typically, an alternative fuel system utilizing a container uses a line for incoming material to fill the container and the same line for material to be delivered to the engine, wherein the fill with the line for incoming material often includes contaminant, debris, and other unwanted materials. Such contaminants, debris, and other unwanted materials are then passed to the engine since typical systems use the single line for filling and drawing material from the container. The subject innovation utilizes a fill line for dedicated filling of the container with material and a draw line for dedicated delivery of material from the container to the engine to eliminate any contaminants, debris, or other unwanted materials from reaching the engine or any line between the container and the engine. The dedicated draw line and fill line increase the alternative fuel efficiency of the vehicle, increase longevity of filters, increases life of components, among others.

In an embodiment, the integrated fill system can be employed with a support system that can support or brace the housing which includes the container, wherein the container can house or store a material for a fuel source for a vehicle. In another embodiment, the support system can support or brace the container, wherein the container can house or store a material for a fuel source for a vehicle. The material can be used as a fuel source for a combustible fuel engine, an alternative fuel, or a fuel to power a device that powers or charges a battery used for the vehicle. In an embodiment, the material housed can be a compressed gas. In another embodiment, the material housed by the container can be natural compressed gas (CNG), hydrogen, a gas, a compressed gas, among others. The support system can support or brace one or more housings (that include one or more containers) or containers that house a portion of material and such containers can be vertically oriented, horizontally oriented, a position in-between horizontal and vertical (in comparison to the ground), or a combination thereof. The support system can further include electrical and/or mechanical connective means in order to provide electrical and/or mechanical connectivity between the support system and the vehicle.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "vehicle" as used herein may be a mobile machine or a moveable transportation asset that transports at least one of a person, people, or a cargo. For instance, a vehicle can be, but is not limited to being, a semi, a semi-truck, a semi-trailer truck, a tractor-trailer, a transfer truck, an 18-wheeler, a truck, a class 8 vehicle, an automobile, farm equipment, industrial equipment, construction equipment, van, Sport Utility Vehicle (SUV), a truck that carriers a load and/or freight, a cement truck, a delivery truck, a tractor, a flat-bed truck, a bus, and the like. Moreover, a vehicle can be powered by combustible fuel (e.g., unleaded fuel, diesel fuel, compressed natural gas, compressed hydrogen, compressed gas, alternative fuel, among others) or a battery or electric motor. The term "container" as used herein can be defined as any cylinder, tank, housing, canister, and the like of any suitable material that can house or contain at least one of alternative fuels, renewable fuel sources, nonrenewable fuel sources, liquid fuel sources, or gas fuel sources.

FIGS. 1-10 illustrate an integrated fill system 100 or portions thereof for a container 102 that houses a material. The integrated fill system 100 can be employed with a support system (described in figures below), wherein the support system includes one or more bracket assemblies that is configured to support the container 102 within a housing 104, the bracket assembly couples to a chassis of a vehicle supports a portion of the housing 104. The integrated fill system 100 can include the housing 104 encasing the container 102 to provide protection of the container 102 as well as prevent the container or components thereof to be exposed to any environmental elements (e.g., rain, snow, dirt, debris, wind, etc.).

The container 102 can include a first end 101 and a second end 103 opposite thereto. The system 100 can include a fill line 106 and a draw line 108, wherein the fill line 106 can be in fluid communication with a first valve 110 on the first end 101 of the container 102 and the draw line can be in fluid communication with a second valve 112 on the second end 103 of the container 102. The fill line 106 can include a first end in fluid communication with the first valve 110 and a second end opposite the first end that is in fluid communication with a first receptacle 114. The first receptacle is positioned through the housing 104 and is configured to receive at least one of the compressed gas or a nozzle (from a filling station) that dispenses the compressed gas at a first rate of flow into the container 102 (designated on FIG. 1 as "FLOW IN"). A first cap 116 can be configured to removeably mate with the first receptacle 114 to seal access to the receptacle and, in turn, the fill line 106 to an inside of the container 102.

It is to be appreciated that the fill line 106 can include one or more filters positioned in a location such as, but not limited to, proximate to the first end of the fill line 106, proximate to the second end of the fill line 106, or between the first end and the second end of the fill line 106. In another embodiment, a filter can be positioned within the receptacle 114 or a location before and/or after the first valve 110. In an embodiment, the first valve 110 can be a one-way valve for the fill line 106. In another embodiment, the first valve 110 can be a two-way valve for the fill line 106, wherein a pressure relief device (PRD) can be situated to allow pressure release for the container 102.

The draw line 108 can include a first end in fluid communication with the second valve 112 and a second end opposite the first end that is in fluid communication with at least one of an engine, a manifold, a valve, a coupling, or a pressure relief device. The draw line 108 is configured to deliver the compressed gas from inside the container 102 (designated on FIG. 1 as "FLOW OUT"). The flow out from the container 102 can be from an inside of the container 102, through the second valve 112, through the draw line 108 to at least one of a manifold, a portion or component of an engine of the vehicle, additional tubing, a coupling, a valve, a pressure relief device, outside the housing 104, among others.

It is to be appreciated that the draw line 108 can include one or more filters positioned in a location such as, but not limited to, proximate to the first end of the draw line 108, proximate to the second end of the draw line 108, or between the first end and the second end of the draw line 108. In another embodiment, a filter can be positioned within the draw line prior to entry to the engine, prior to receipt at a manifold, or a location before and/or after the second valve 112. In an embodiment, the second valve 112 can be a one-way valve for the draw line 108. In another embodiment, the second valve 112 can be a two-way valve for the draw line 108, wherein a pressure relief device (PRD) can be situated to allow pressure release for the container 102.

In an embodiment, the first cap 116 can include a sensor 118 that detects whether the first cap 116 is engaged with the receptacle 114. By way of example and not limitation, the sensor 118 can detect connectivity between the first cap 116 and the receptacle 114. If the first cap 116 and the receptacle 114 are detected to be coupled, the engine can be started and/or activated. If the first cap 116 and the receptacle 114 are detected to be not coupled 118, the engine can be prevented from starting or activating for safety concerns. In another example, the decoupling of the first cap 116 and the receptacle 116 can initiate a notification such as, but not limited to, an audible alert, a visual alert, an electronic communication (e.g., a text, an email, a portion of a graphic, a portion of a video, etc.), a haptic feedback, a restriction to the vehicle (e.g., prevention of moving vehicle out of a park position of the transmission, prevention of removing an emergency brake, prevention of turning ignition, prevention of allowing a key to be inserted into ignition, prevention of a starter for the engine activating, among others).

The fill line 106 is a dedicated line (e.g., tubing, conduit, and the like) that receives material from outside the container 102 for filling and/or receipt into the container 102. Typically, debris, contaminants, or other particles may enter through a filling process which are harmful or unwanted for a fuel system of a vehicle. With the integrated fill system 100, the debris, contaminants, or other particles may enter through a filling process can be filters prior to entry with a filter and/or can settle within the container 102. By way of example and not limitation, the debris, contaminants, or other particles that may enter through the filling process may coat or be within the fill line 106 or settle at a low point or bottom of the container 102. The draw line 108 is dedicated to deliver the material from the container 102 for use and is not contaminated by the debris or contaminants within the fill line 106.

It is to be appreciated that the manifold can be located in at least one of within the housing 104, outside the housing 104, proximate to an engine, proximate to an engine compartment, between an engine compartment and the housing, among others.

Moreover, it is to be appreciated that the integrated fill system 100 can include one or more fill lines that are dedicated to receive a material for the container 102. In an embodiment, the integrated fill system 100 can include a first fill line and receptacle on the first end 101 and a second fill line and receptacle on the second end. In another embodiment, the integrated fill system 100 can include a first fill line and receptacle on the first end 101, a second fill line and receptacle on the second end, and one or more additional fill line and receptacle therebetween.

In an embodiment, the integrated fill system 100 can be configured for at least one of NGV1 or NGV2 if the material in the container 102 is a compressed gas. In particular, NGV1 is a natural gas version 1 having a first rate of flow for filling the container 102. NGV2 is a natural gas version 2 having a second rate of flow for filling the container 102, wherein the second rate of flow is greater than the second rate of flow. In particular, the NGV2 can be referred to as "fast fill" and NGV1 can be referred to as "regular fill."

Figure 2:
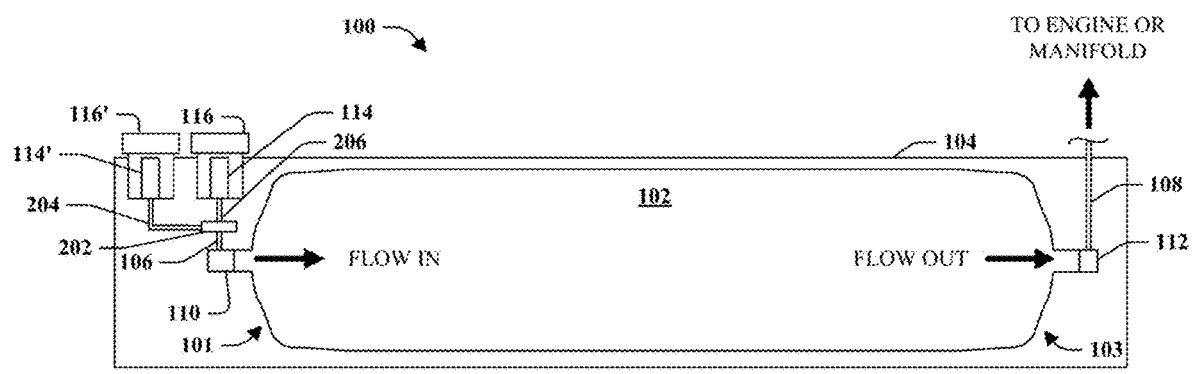
FIG. 2 is cross-sectional view of an integrated fill system that includes a housing that encases a container.

FIG. 2 illustrates the integrated fill system 100 having the first receptacle 114 (with the first cap 116 that can removeably mate to the receptacle 114) in fluid communication with the first valve 110 and a second receptacle 114' (having a second cap 116' that can removeably mate to the receptacle 114') in fluid communication with the first valve 110 (collectively referred to as "the receptacles 114"), wherein the first receptacle 114 and the second receptacle 114' are configured to receive material to be received by the container 102. It is to be appreciated that the first receptacle 114 and the second receptacle 114' can include connections, tubing, couplers, valves, among others to allow receipt and flow from the respective receptacle to the first valve 110 and/or into the container 102 and the connections for fluid connectivity therebetween can be selected with sound engineering judgment without departing from the scope of the subject innovation. Moreover, it is to be appreciated that although two (2) receptacles are illustrated in FIG. 2, one or more receptacles and associated features (e.g., lines, caps, valves, filters, etc.) can be incorporated into the container 102 and such illustrative embodiment is not to be limiting on the subject innovation.

In an embodiment, the receptacles 114 can be positioned on the first end 101 of the container 102 and on a top portion of the container 102 in comparison to a ground level. In another embodiment, the receptacles 114 can be positioned on the second end 103 of the container 102 and on a top portion of the container 102 in comparison to a ground level. In still another embodiment, the receptacles 114 can be positioned on a location on a top portion of the container 102 in comparison to a ground level. It is to be appreciated that the location of the one or more receptacles 114 can be positioned on a location on the container 102 and such positions can be selected with sound engineering judgment without departing from the scope of the subject innovation.

In an embodiment, the draw line 106 can receive at a splitter 202 one or more connection lines for the receptacles 114. In particular, the first receptacle 114 can be in fluid communication to the splitter 202 via the connection line 206. The second receptacle 114' can be in fluid communication to the splitter 202 via the connection line 208. It is to be appreciated that the splitter 202 can receive one or more connection lines for one or more receptacles directly or indirectly (e.g., downstream from additional splitters, etc.). In another embodiment, the receptacles 114 can include respective draw lines 106 that respectively fluidly communicate with the valve 110, wherein each receptacle has a direct line to the valve 110.

The integrated fuel system 100 can include one or more filters and/or pressure relief devices (PRDs) as discussed above. For example, a filter can be included in line, after, or within the splitter 202. In another example, a filter can be included at the respective receptacles and/or at the valve 110. A PRD can be situated within the splitter 202 which can be activated based on a parameter (discussed in detail below). In another example, the PRD can be situated within at least one of the splitter 202 or the valve 110.

In an embodiment one of the receptacles 114 can be configured and utilized to fill the container 102 using NGV1 and the other receptacle can be configured and utilized to fill the container 102 using NGV2. It is to be appreciated that the receptacles 114 can be configured and utilized to fill the container 102 using at least one of NGV1, NGV2, or a combination thereof for the receptacles 114.

Figure 3:
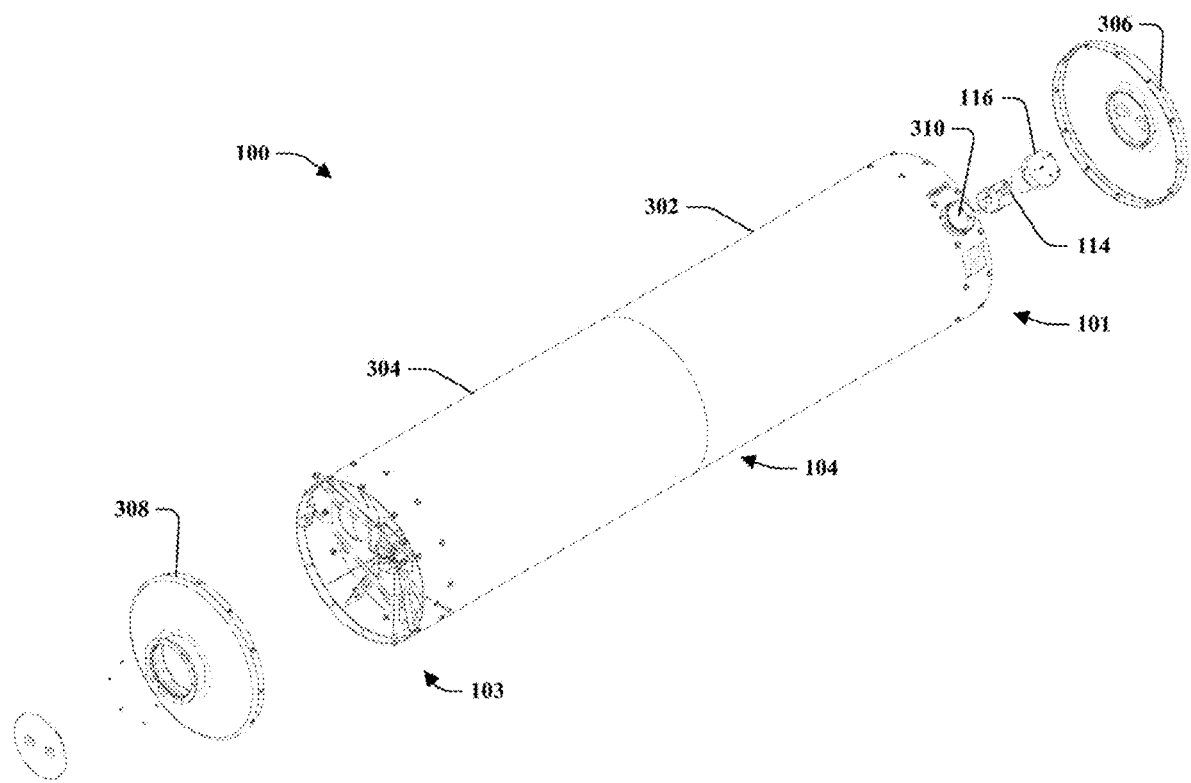
FIG. 3 is an exploded view of an integrated fill system that includes a housing, first inner plate, second inner plate, truss assembly, first shield plate, second shield plate, and end caps.

Turning to FIG. 3, the integrated fuel system 100 is illustrated with a partially exploded view. The integrated fuel system 100 can include the housing 104 that encases the container 102, wherein the container 102 has the first end 101 and the second end 103 opposite thereto. In this embodiment, the second end 103 is positioned toward the front of the vehicle and the first end 101 is positioned toward the rear of the vehicle. The housing 104 can be fabricated from one or more pieces of material, wherein the material can be metal, steel, aluminum, cast iron, nickel, plastic, carbon wrap, a metal alloy, a combination thereof. In particular, the housing 104 can include a first end portion 302 and a second end portion 304. In another embodiment, the housing 104 can be fabricated from a first end portion, a middle portion, and a second end portion.

The housing 104 can be enclosed with a first end cap 306 for the first end 101 and a second end cap 308 for the second end 103. Moreover, the housing can include an aperture 310 through which the receptacle 114 passes in order to be in fluid communication with the container 102 directly or indirectly (e.g., using the draw line 106, valves, PRDs, couples, etc.).

Figure 4:
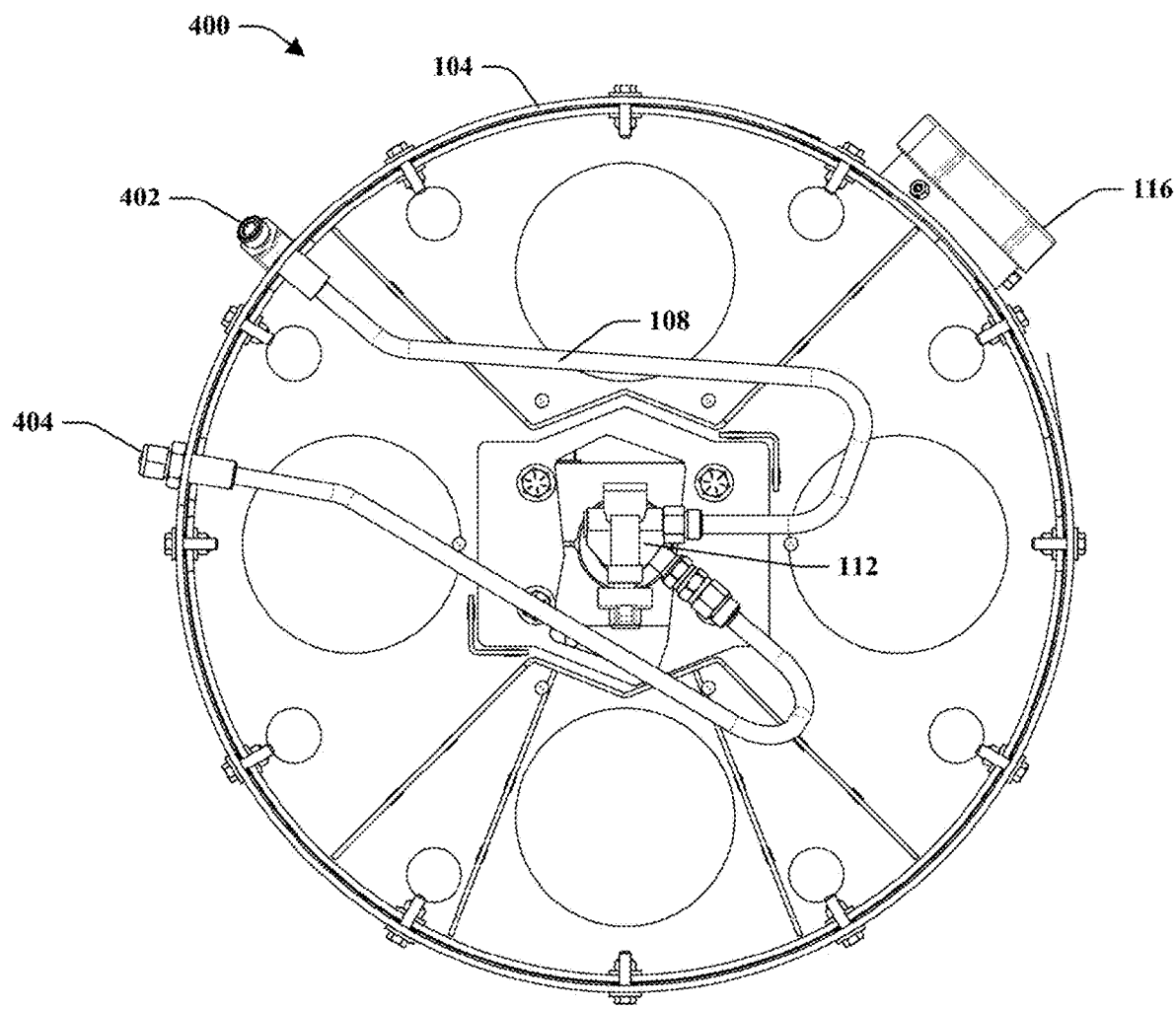
FIG. 4 is a front view of the integrated fill system.

Turning to FIG. 4, a view 400 looking from the second end 103 toward the first end 101 of the integrated fuel system 100 is illustrated. The draw line 108 is illustrated being in fluid communication with the second end 103 having the valve 112, wherein the draw line 108 delivers material from the container 102 to the engine or manifold from cross-over port 402. It is to be appreciated that the draw line 108 is illustrated with couplings, tubing, etc. to provide fluid communication from the container at the second end 103 through the valve 112 to the cross-over port 402. The integrated fuel system 100 further includes a pressure relief device (PRD) 404 in fluid communication with at least one of the second end 103 of the container 102 or the valve 112.

Figure 5:
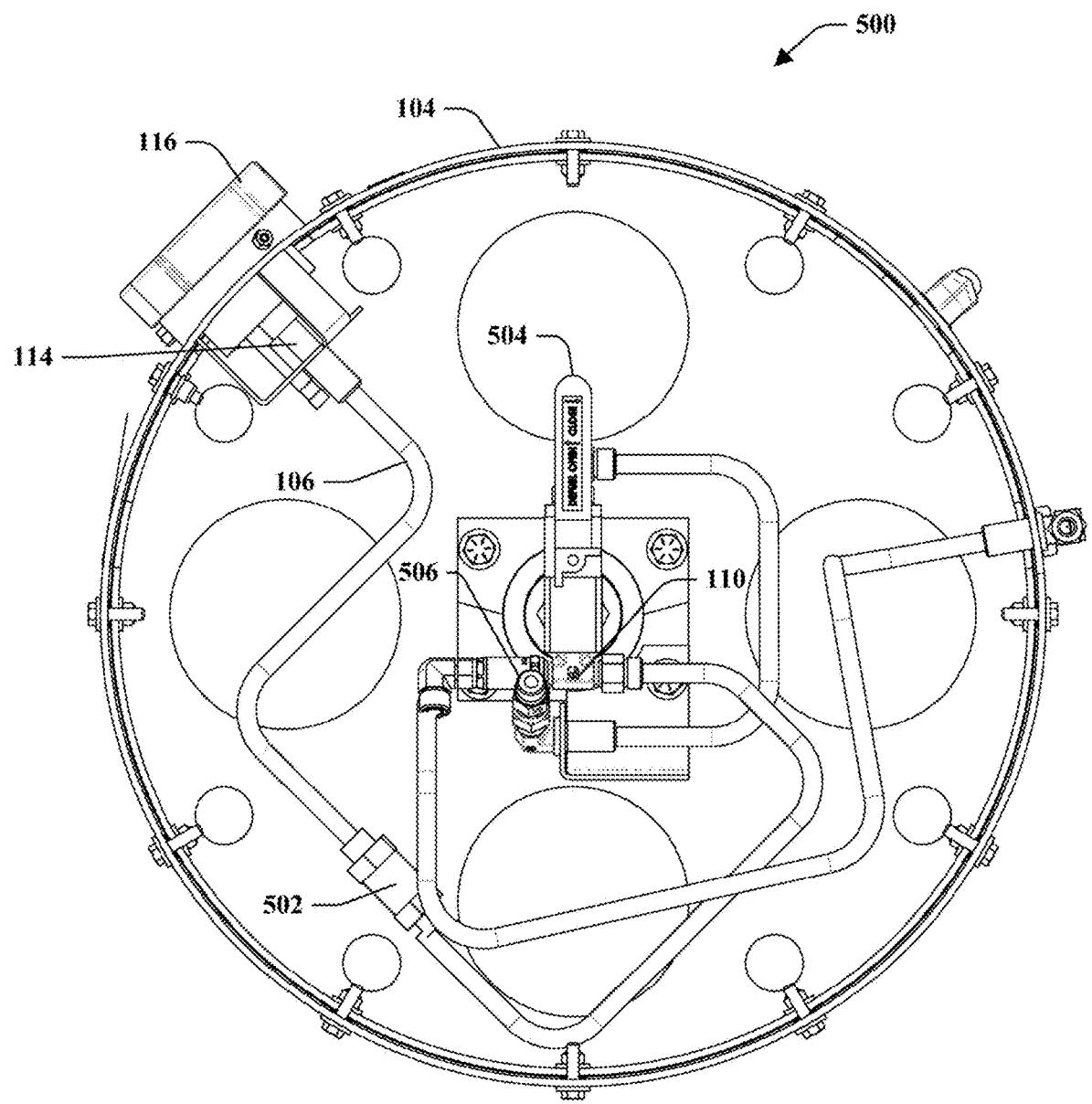
FIG. 5 is a rear view of the integrated fill system.

Turning to FIG. 5, a view 500 looking from the first end 101 toward the second end 103 of the integrated fuel system 100 is illustrated. The fill line 106 is illustrated being in fluid communication with the receptacle 114 having the first cap 116 that removeably mates thereto and with the first valve 110. The fill line 106 can include a check valve 502. Additionally, the integrated fuel system 100 can include a manual lever 504 that can allow release of material from the container 102 through tubing to the defuel nozzle 506.

Figure 6:
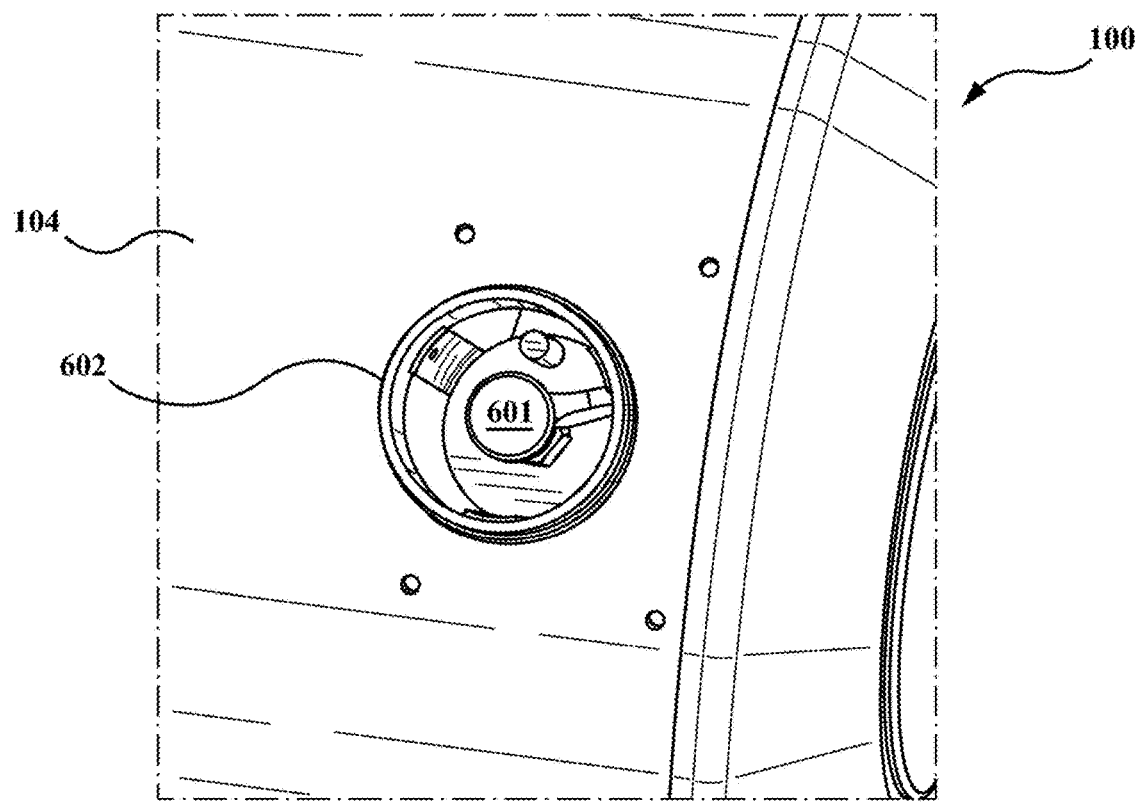
FIG. 6 is a receptacle positioned through the housing and the receptacle is configured to receive at least one of the compressed gas or a nozzle that dispenses the compressed gas at a rate of flow into the container.
Figure 7:
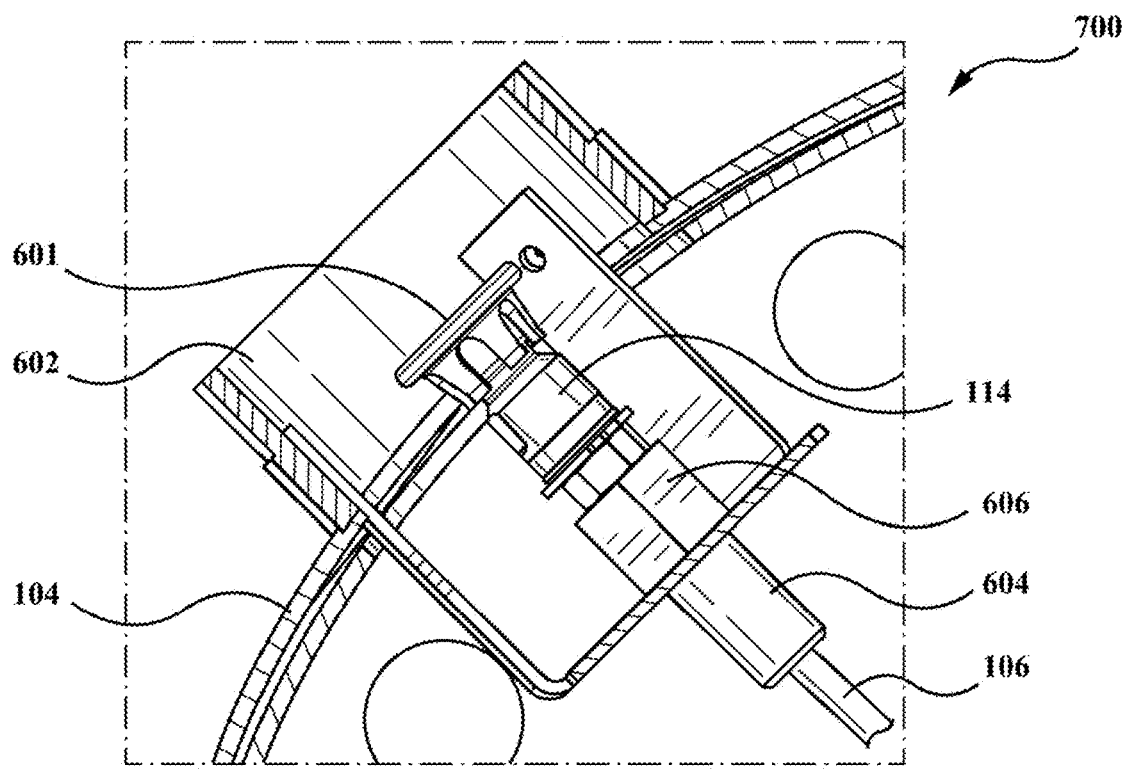
FIG. 7 is a cross-sectional view of the receptacle illustrated in FIG. 6.

FIGS. 6 and 7 illustrate the integrated fuel system 100 and in particular an integrated fuel system 100 that utilizes a receptacle for NGV1 also referred to as regular fill. It is to be appreciated that the integrated fuel system 100 can include at least one of the NGV1, NGV2, or a combination thereof. FIG. 6 illustrates a close up view of the receptacle 116 having a cap 601 coupled thereto. The receptacle 116 is inserted through an aperture of the housing 104 with a bracket 602 situated therein. FIG. 7 is a cross-sectional view 700 of the integrated fuel system 100 shown in FIG. 6. The bracket 602 is positioned with an aperture of the housing 104 and the receptacle 114 is inserted through a bottom of the bracket 602 to be accessible within the bracket 602 while also providing fluid communication with the fill line 106.

The receptacle 114 can include a tube portion 604 that is inserted through the bottom of the bracket 602 and secured with a nut 606 on a threading of the tube portion 604. It is to be appreciated that the receptacle 114, the nut 606, the tube portion 604, and the fill line 106 can be coupled to prevent any leakage and can be selected with sound engineering judgment without departing from the scope of the subject innovation. It is to be further appreciated that a filter can be positioned between the receptacle 114 and the fill line 106 and/or before the valve 110 prior to entry into the container 102.

Figure 8:
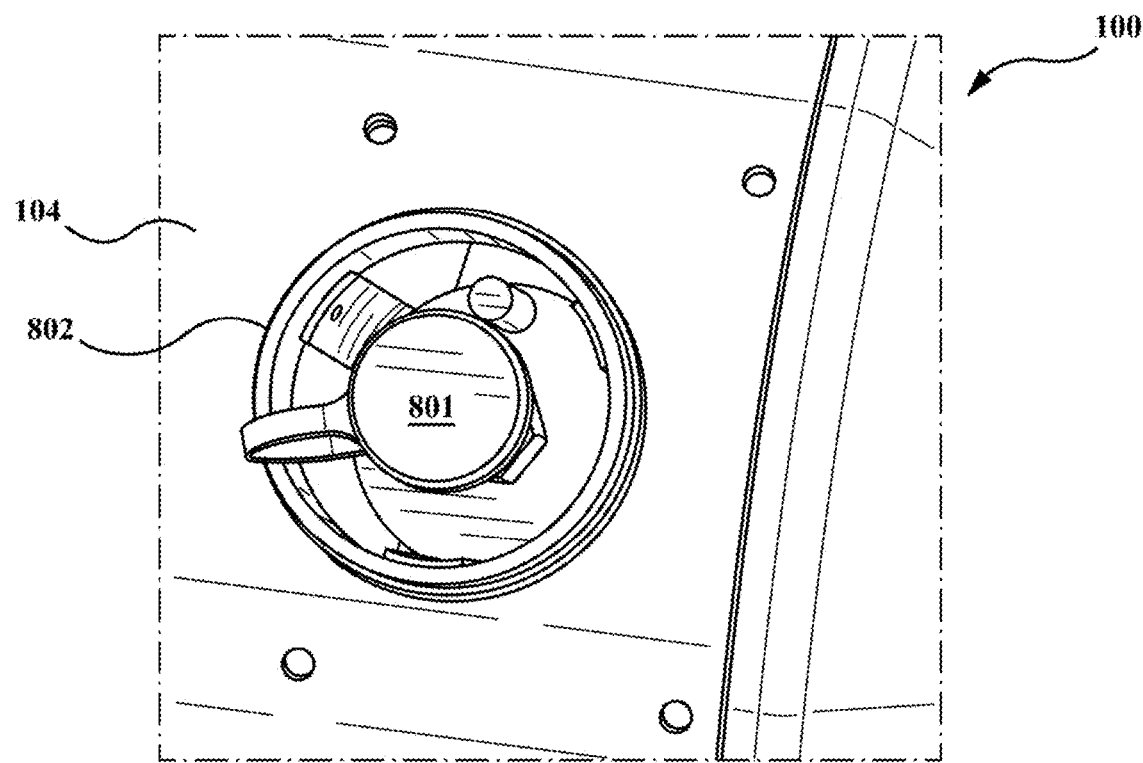
FIG. 8 is a receptacle positioned through the housing and the receptacle is configured to receive at least one of the compressed gas or a nozzle that dispenses the compressed gas at a rate of flow into the container.
Figure 9:
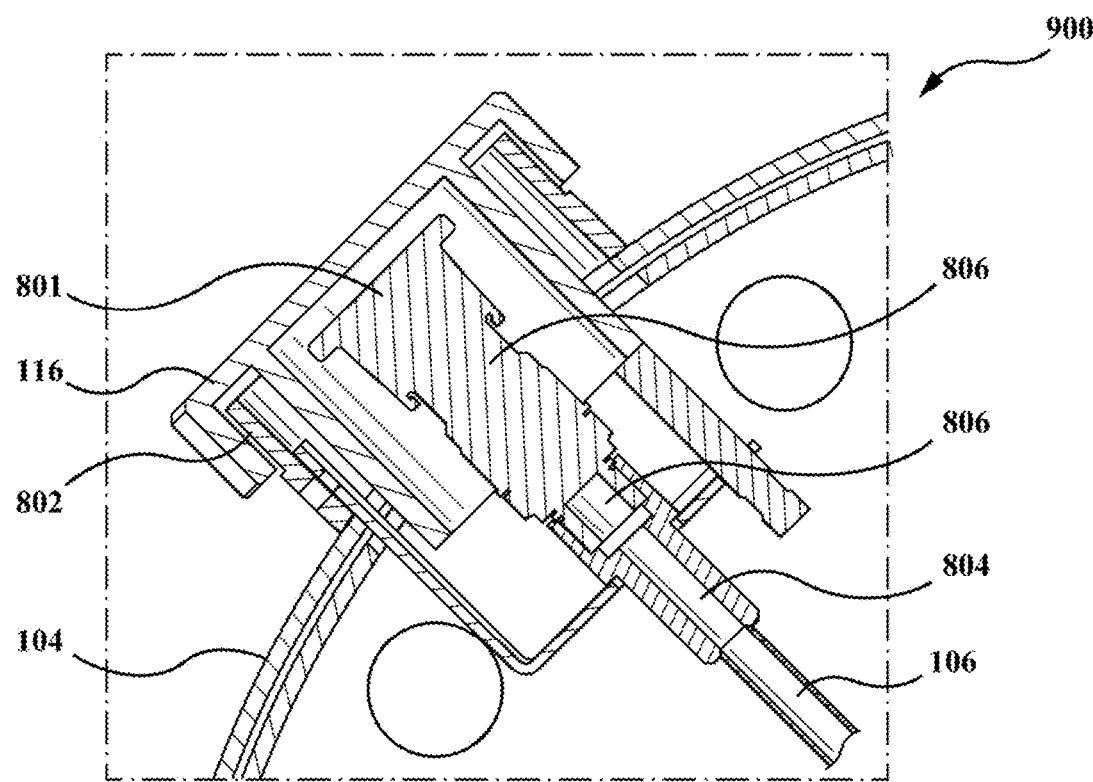
FIG. 9 is a cross-sectional view of the receptacle illustrated in FIG. 8.

FIGS. 8 and 9 illustrate the integrated fuel system 100 and in particular an integrated fuel system 100 that utilizes a receptacle for NGV1 also referred to as regular fill. It is to be appreciated that the integrated fuel system 100 can include at least one of the NGV1, NGV2, or a combination thereof. FIG. 8 illustrates a close up view of the receptacle 116 having a cap 801 coupled thereto. The receptacle 116 is inserted through an aperture of the housing 104 with a bracket 802 situated therein. FIG. 9 is a cross-sectional view 900 of the integrated fuel system 100 shown in FIG. 8. The bracket 802 is positioned with an aperture of the housing 104 and the receptacle 114 is inserted through a bottom of the bracket 802 to be accessible within the bracket 802 while also providing fluid communication with the fill line 106. The receptacle 114 can include a tube portion 804 that is inserted through the bottom of the bracket 602 and secured with a nut 806 on a threading of the tube portion 804. It is to be appreciated that the receptacle 114, the nut 806, the tube portion 804, and the fill line 106 can be coupled to prevent any leakage and can be selected with sound engineering judgment without departing from the scope of the subject innovation. It is to be further appreciated that a filter can be positioned between the receptacle 114 and the fill line 106 and/or before the valve 110 prior to entry into the container 102.

Figure 10:
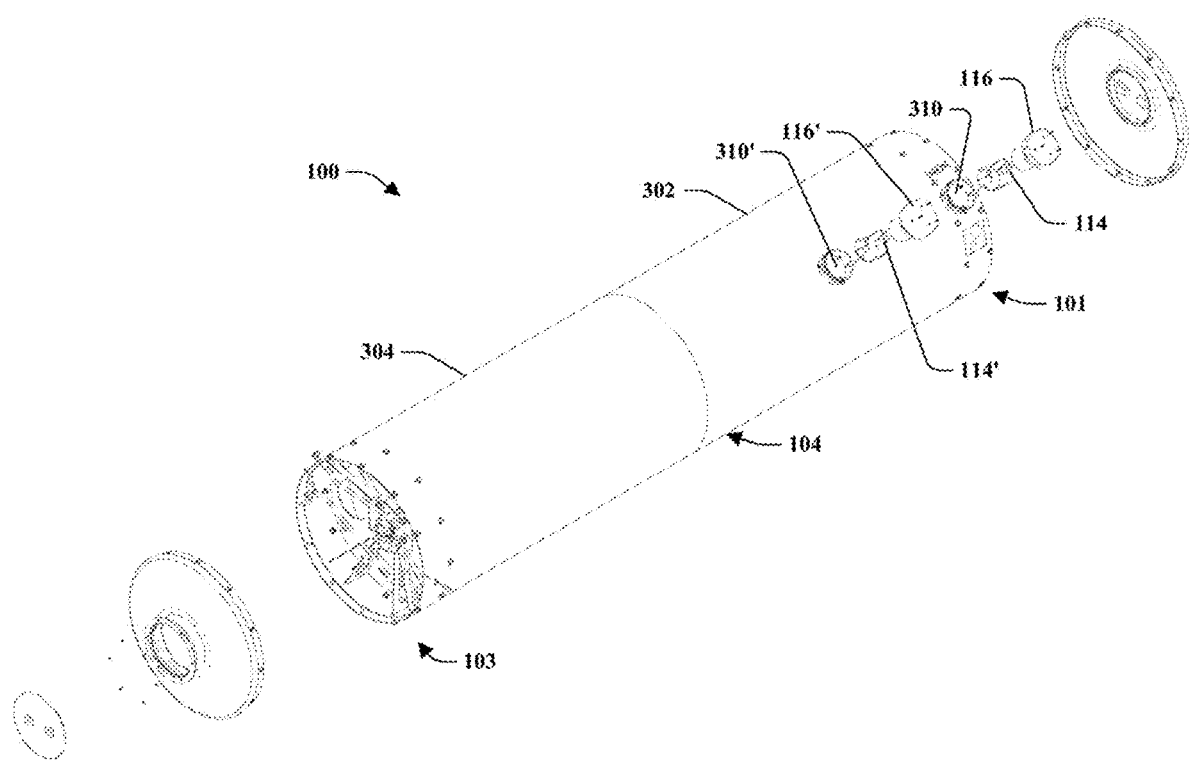
FIG. 10 is an exploded view of an integrated fill system that includes a housing, first inner plate, second inner plate, truss assembly, first shield plate, second shield plate, and end caps.

FIG. 10 illustrates the integrated fuel system 100 with a partially exploded view. The integrated fuel system 100 can include the housing 104 that encases the container 102, wherein the container 102 has the first end 101 and the second end 103 opposite thereto. In this embodiment, the second end 103 is positioned toward the front of the vehicle and the first end 101 is positioned toward the rear of the vehicle. The housing 104 can be fabricated from one or more pieces of material, wherein the material can be metal, steel, aluminum, cast iron, nickel, plastic, carbon wrap, a metal alloy, a combination thereof. In particular, the housing 104 can include a first end portion 302 and a second end portion 304. In another embodiment, the housing 104 can be fabricated from a first end portion, a middle portion, and a second end portion.

The housing 104 can be enclosed with a first end cap 306 for the first end 101 and a second end cap 308 for the second end 103. Moreover, the housing can include an aperture 310 through which the receptacle 114 passes in order to be in fluid communication with the container 102 directly or indirectly (e.g., using the draw line 106, valves, PRDs, couples, etc.).

The integrated fuel system 100 in FIG. 10 is illustrated having a first fill system (e.g., the first receptacle 114, the first cap 116, the aperture 310 and a respective draw line 106) and a second fill system (e.g., the second receptacle 114', the second cap 116', the aperture 310', and a respective draw line 106'). It is to be appreciated that the integrated fill system 100 can include one or more fill systems positioned on a location of the housing 104 and such number of fill systems and positions can be selected with sound engineering judgment without departing from the scope of the subject innovation.

Figure 11:
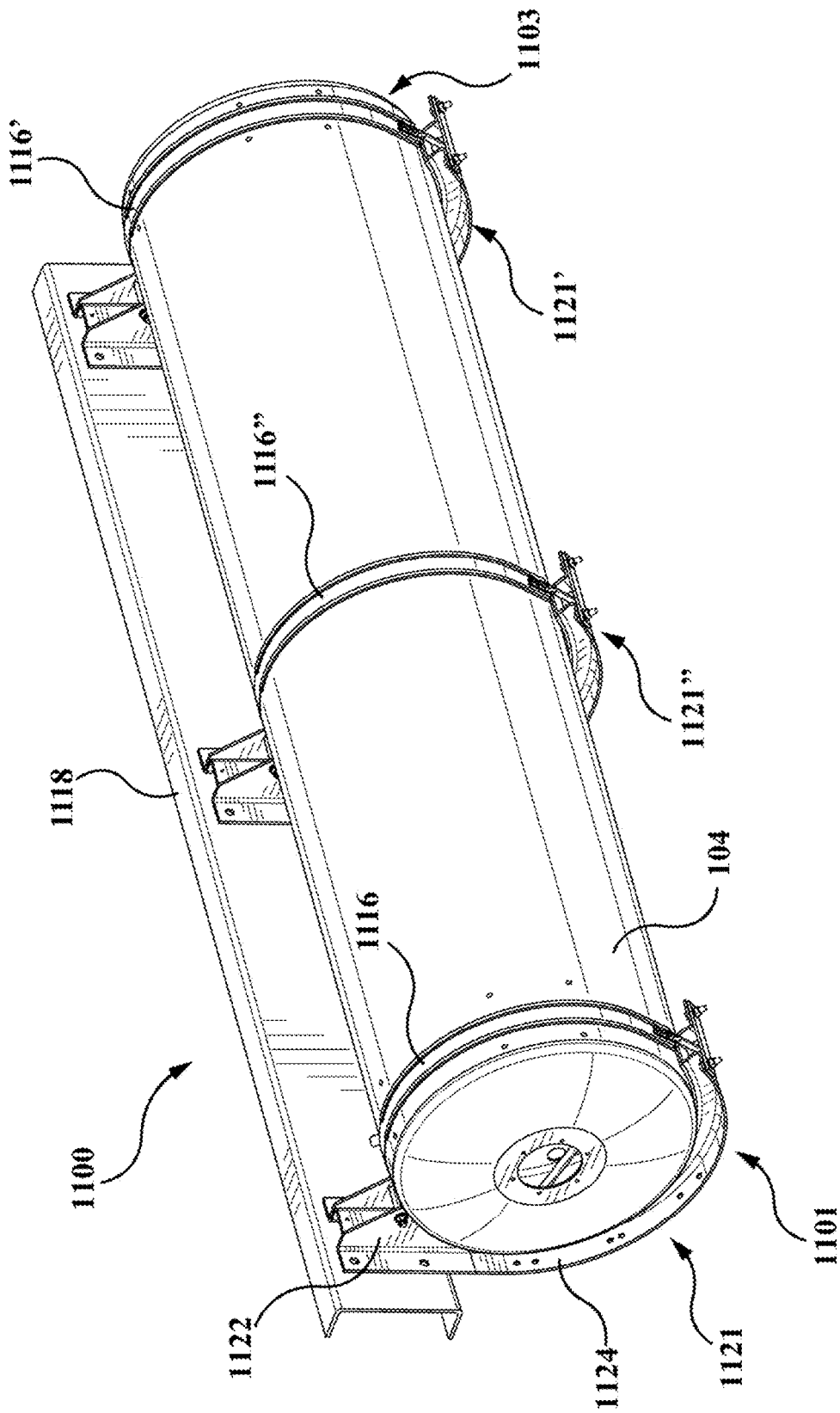
FIG. 11 is view of a support system coupled or supporting a housing.
Figure 12:
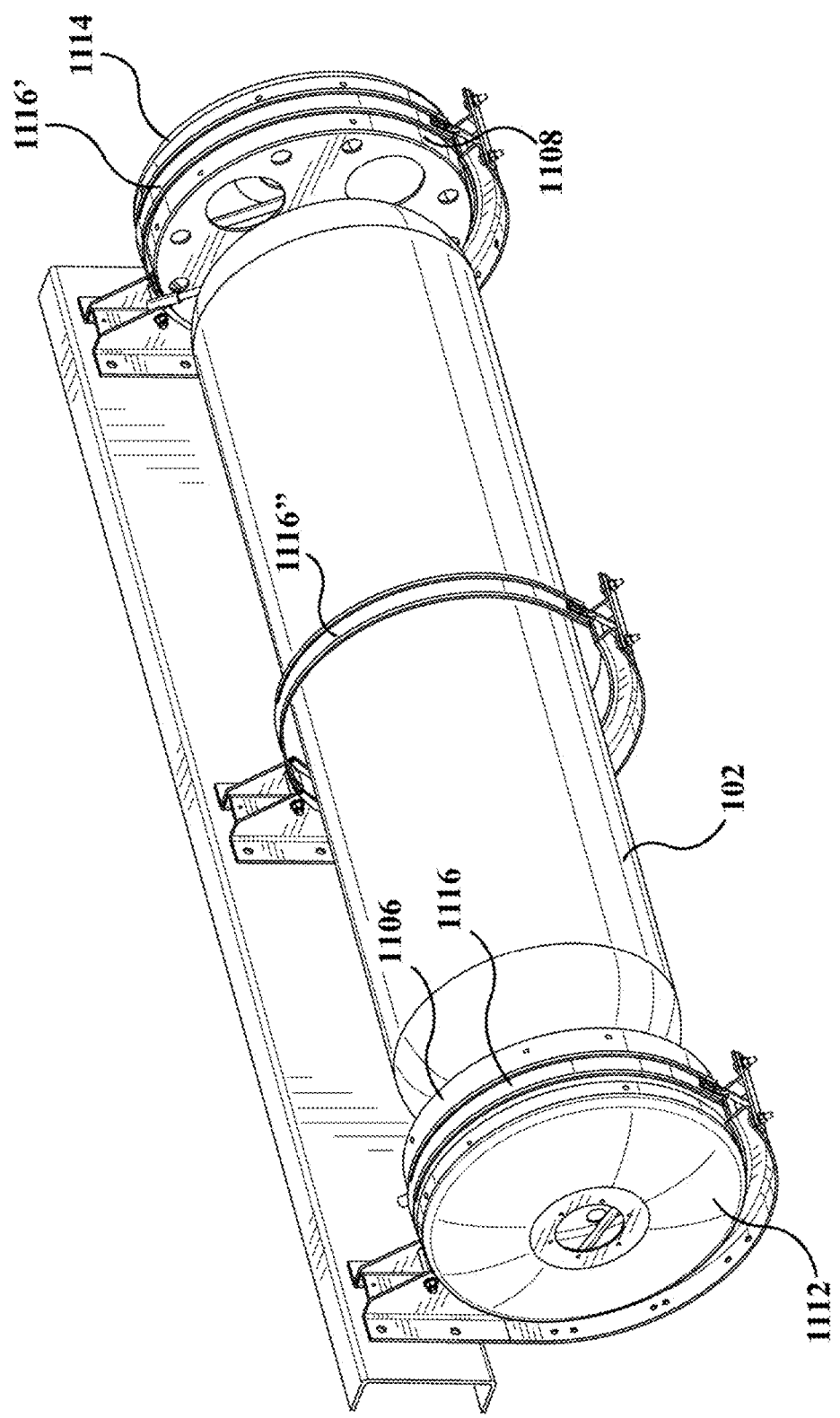
FIG. 12 is an illustration of a support system with the housing removed.
Figure 13:
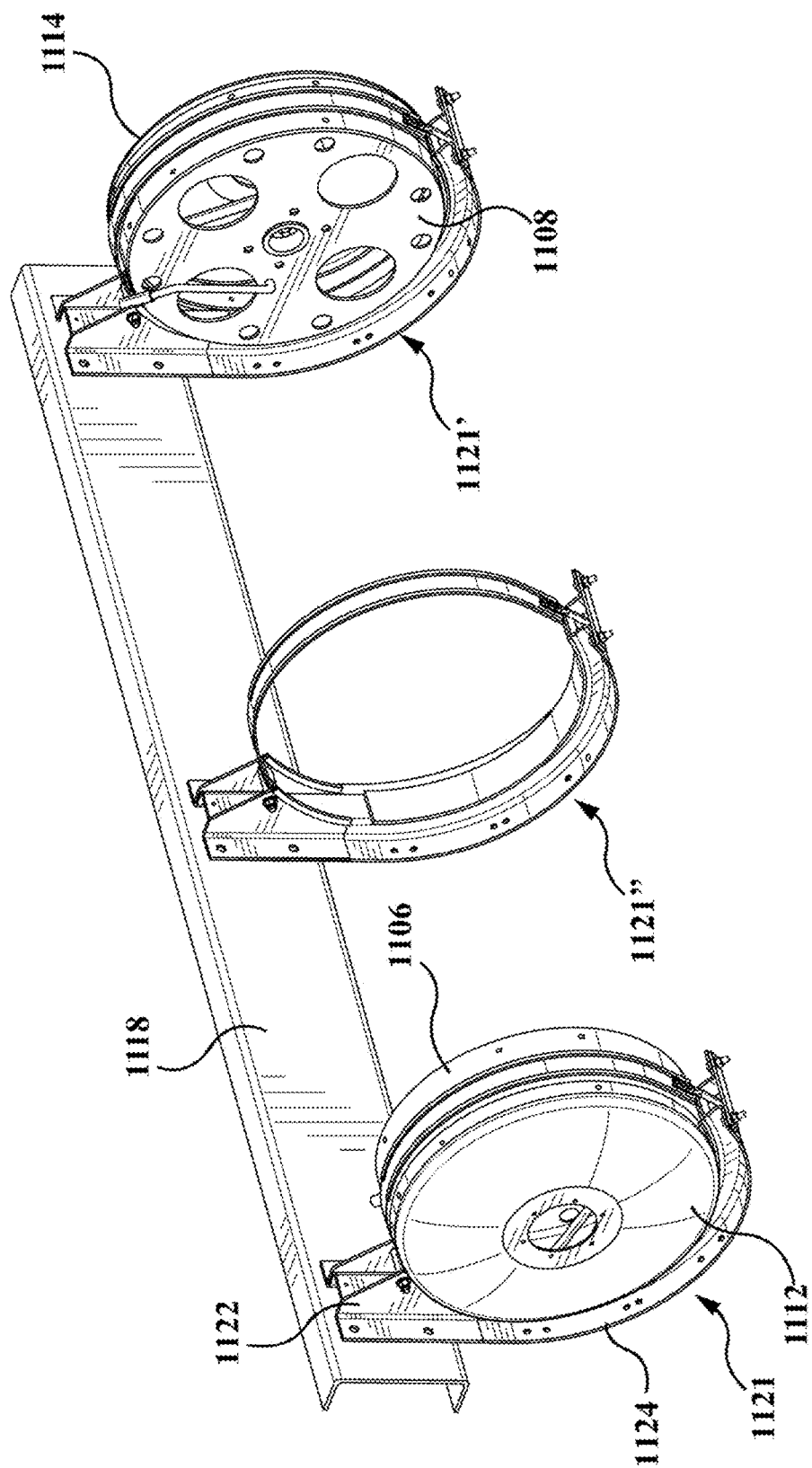
FIG. 13 is an illustration of a support system without a housing or a container.
Figure 14:
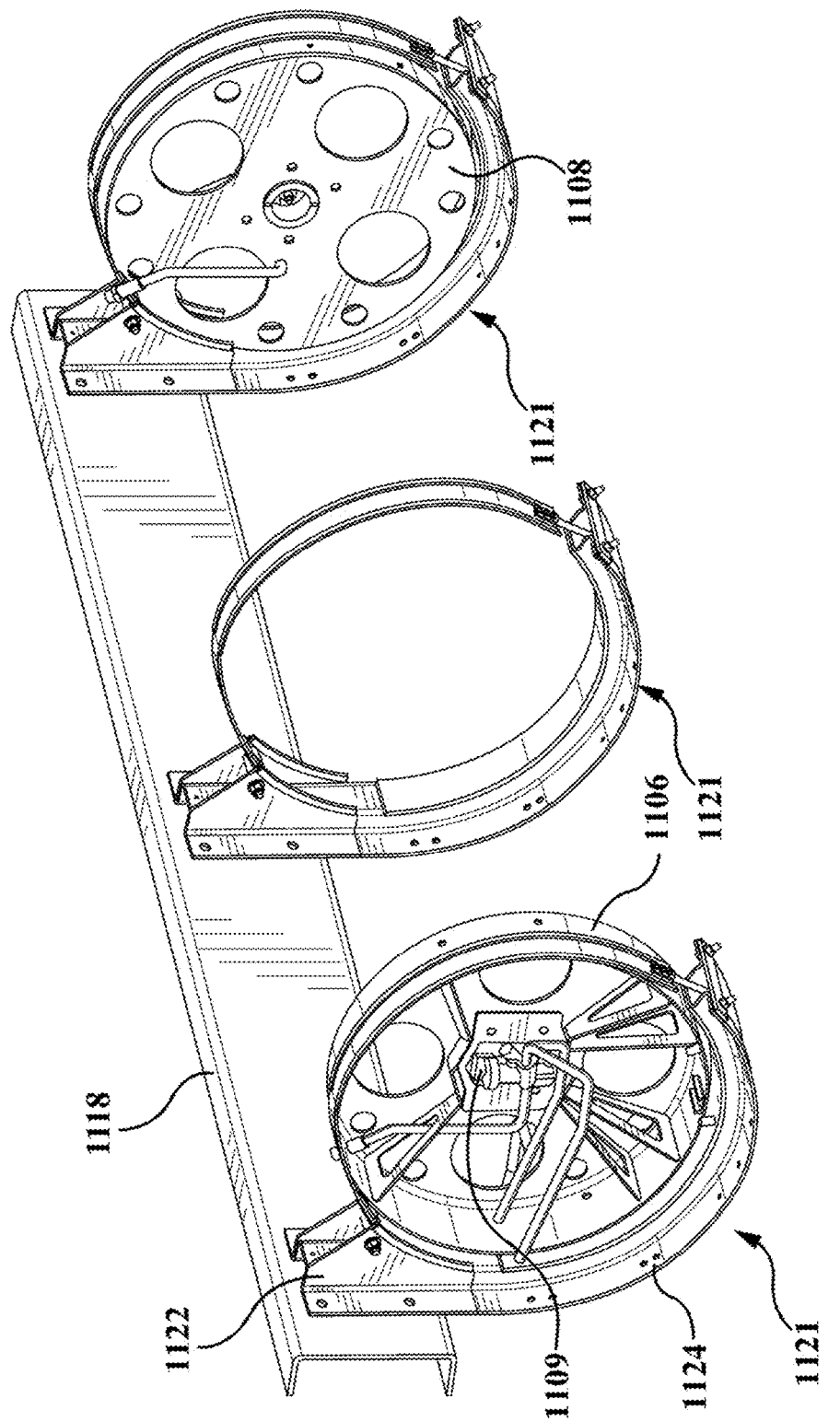
FIG. 14 is an illustration of one or more elements a support system.

It is to be appreciated that the integrated fill system 100 as illustrated and discussed in FIGS. 1-10 can be employed with the support system 1100 and, in particular, incorporated with the housing 104. Moreover, it is to be appreciated that the integrated fill system 100 can be positioned or on the support system 1100 in various locations or positions in FIGS. 11-33. FIG. 11 illustrates the support system 1100 that is configured to affix to a portion of a vehicle. FIG. 12 illustrates the support system 1100 without the housing 104 illustrated but with the container 102. FIG. 13 illustrates the support system 1100 without the housing 104 and without the container 102. FIG. 14 illustrates the support system 1100 without the housing 104, without the container 102, without the first shield plate 1112 and without the second shield plate 1114.

The support system 1100 can support, brace, secure, and/or hold one or more containers within the housing, wherein the support system 1100 includes elements for support and protection of the container 102. In particular, the support system 1100 includes a housing 104 that encases the container 102 (collectively referred to as a storage system). By way of example and not limitation, the housing 104 can be a shape which matches or is similar to a shape of the container 102. In a particular embodiment, the container 102 can be a cylindrical shape and the housing 104 can be a cylindrical shape having a size that is capable of enclosing the container 102 within the housing 104.

Figure 31:
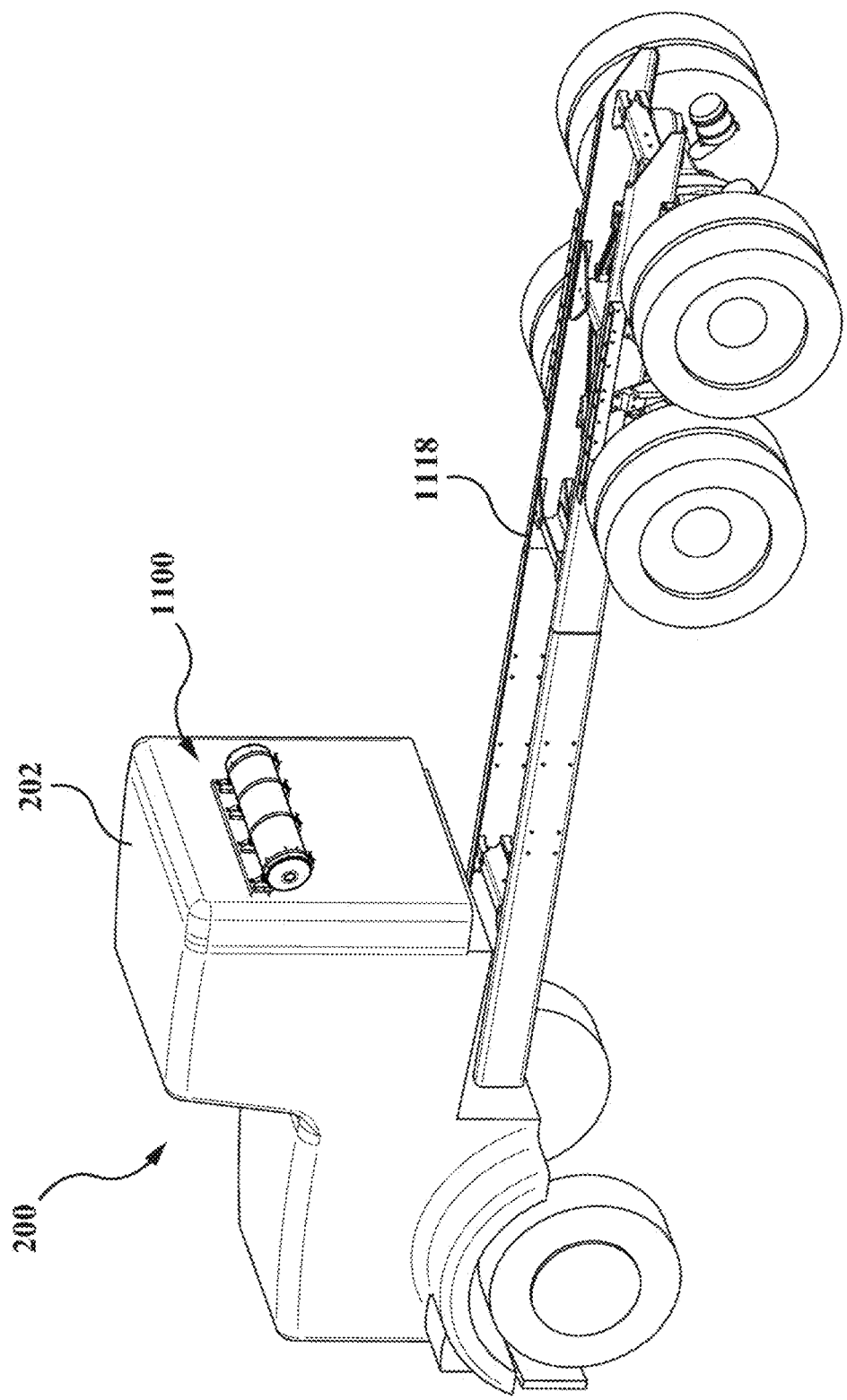
FIG. 31 is an illustration of a support system coupled to a cabin of a vehicle.
Figure 32:
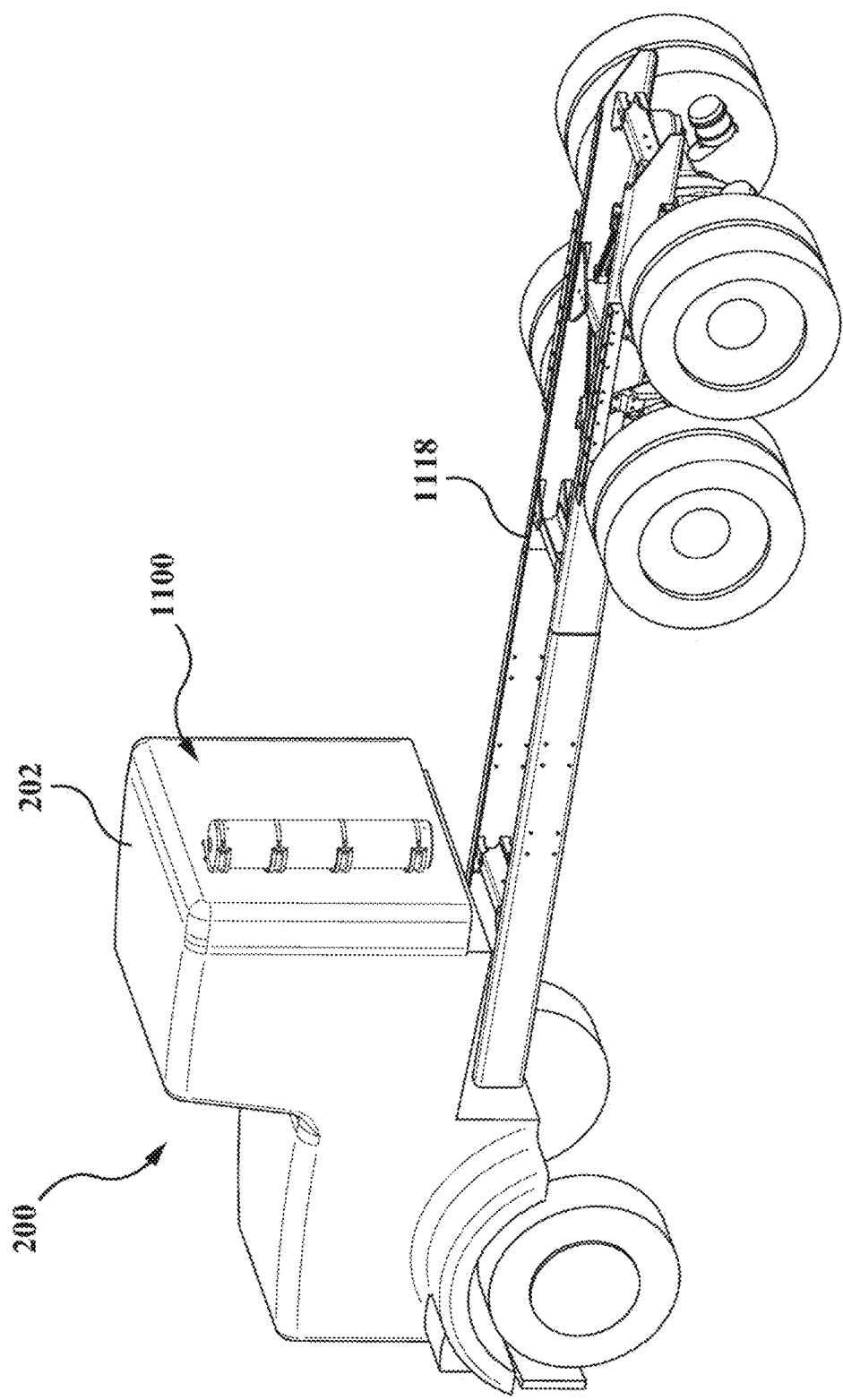
FIG. 32 is an illustration of a support system coupled to a cabin of a vehicle.

The support system 1100 can be coupled to at least one of a frame of a vehicle, a chassis of a vehicle, a structure of a vehicle, among others. Moreover, the support system 1100 can be coupled or affixed at a location that is below a cabin of the vehicle, wherein the cabin is at a location in which a passenger or driver are seated. By way of example and not limitation, the vehicle can incorporate one or more support systems 1100 such that a first support system is positioned on a driver side and a second support system is positioned on a passenger side. In another embodiment, the vehicle can have one or more support systems coupled at locations such as, but not limited to, above a frame or chassis of the vehicle, behind a cabin of a vehicle and above a frame, below a frame or chassis of the vehicle and below a cabin of a vehicle, among others. It is to be appreciated that if more than one support system is utilized on a vehicle, the location for each support system can be symmetrical in position, or not symmetrical. For instance, a vehicle can utilize a first support system in a vertical position behind the cab and above the chassis and a second support system in a horizontal position below the cab and level with or below the chassis. Various configurations of the support system 1100 attached to a vehicle 200 or a cabin 202 are illustrated in FIGS. 31-33.

For a support system 1100 that includes a container 102 that is oriented horizontal compared to the ground level, the container 102 can be underneath a portion of a cabin of the vehicle on a side (e.g., passenger side, driver side, or a position in between the passenger side and driver side) of the vehicle and mounted to a frame of the vehicle, a chassis of the vehicle, a structure affixed to a vehicle, or a structure affixed to a chassis or frame of the vehicle. In another embodiment, the support system 1100 can include a container 102 that is oriented horizontal compared to the ground level and parallel compared to an axle of the vehicle (e.g., a position that has the container first end on the driver side and the second side on the passenger side), wherein the support system 100 is coupled to a back of a cab.

For a support system that includes a container that is oriented vertical compared to the ground level, the container can be positioned behind a cabin of the vehicle and mounted to a frame of the vehicle, a chassis of the vehicle, a structure affixed to the vehicle, a portion of a cabin of the vehicle, or a structure affixed to a chassis or frame of the vehicle.

The one or more containers can reside in a plane that is in a linear orientation and located in a substantially similar plane as at least one of an axle of the vehicle, a chassis of the vehicle, a driveshaft of the vehicle, or the frame of the vehicle. Further, the one or more containers may be parallel to a ground to which the vehicle travels. In an embodiment, the support system 1100 can be adapted to be used with a vehicle that is powered by a combustible fuel engine, an alternative fuel, a battery, or a combination thereof. The subject innovation describes a support system 1100 that can be attached to at least one of a portion of a vehicle underneath a portion of a cabin, a portion of a structure of the vehicle, along a side of the vehicle, or a portion of a cabin or frame at a position behind a cabin of the vehicle, among others.

In an embodiment, the support system 1100 can be affixed to a cab of a vehicle in which one or more containers are oriented in a vertical position or substantially vertical in comparison to the ground level (e.g., a length of the container being perpendicular or substantially perpendicular to a chassis or frame of the vehicle).

The support system 1100 can be positioned on a vehicle on a location that is where a diesel fuel tank would exist such as a saddlebag configuration. In particular, the support system 1100 can be retrofitted to a vehicle in a location where a diesel fuel storage is positioned or located. For instance, a vehicle can be manufactured and one or more diesel fuel storages can be removed and replaced with the support system 1100. The support system 1100 can be positioned between the steer axle and the drive axle of a vehicle and at a location below or at the chassis 118 of the vehicle. For instance, the support system 1100 can be used to exchange or replace a diesel fuel tank with the support system 1100. The replacement or exchange can allow removal of the diesel tank(s) and attaching the bracket assemblies and other elements.

The container 102 can be cylindrical in shape but it is to be appreciated that the container 102 can be a shape that holds a volume of a material and such shape can be selected with sound engineering judgment without departing from the scope of the subject innovation. The container 102 is described in more detail in FIG. 16 and below.

The support system 1100 can include a bracket assembly 1121 that is coupled to at least one of a chassis 1118 of a vehicle, a frame of a vehicle, or a structure on a vehicle. It is to be appreciated that the support system 1100 can include one or more bracket assemblies 1121 and a number of bracket assemblies 1121 can be selected with sound engineering judgment without departing from the scope of the subject innovation. In a particular embodiment, a vehicle can include a first support system 1100 that can include three (3) bracket assemblies 1121 located on a driver side and a second support system 1100 that can include three (3) bracket assemblies 1121. In another embodiment, the vehicle can include one or more support systems 1100, wherein the support system 1100 can include two (2) bracket assemblies.

The housing 104 is an exterior barrier that the container 102 is placed within to provide protection for the container 102 and any other components, modules, valves, connectors, tubing, etc. within the housing 104. The housing 104 can be a shape and size that is configured to enclose the container 102. In an embodiment, the housing 104 can be a first shape defining a first volume and the container 102 can be a second shape defining a second volume, wherein the first shape is similar to the second shape and the first volume is greater than the second volume to allow the container 102 to fit inside the housing 104. The housing 104 can include a first end 1101 and a second end 1103 opposite the first end 1101 and a length between the first end 1101 and the second end 1103. The housing 104 can further include a thickness. A first plate shield 1112 can be coupled to the first end 1101 to enclose the first end 101 and a second plate shield 1114 can be coupled to the second end 1103 to enclose the second end 1103. It is to be appreciated that the first plate shield 1112 or the second plate shield 1114 can be releasably coupled or permanently coupled to the first end 1101 or the second end 1103 respectively. It is to be appreciated that the container 102 can be oriented in various manners such as the first end 1101 of the container 102 can be situated toward an engine of the vehicle and the second end 1103 can be situated toward a rear of the cabin or the first end of the container 102 can be situated toward rear of the cabin and the second end 1103 can be situated toward an engine of the vehicle.

The bracket assembly 1121 can couple to a structure on a vehicle or a portion of the vehicle as well as provide support to the housing 104 and the container 102 positioned within. In particular, the bracket assembly 1121 can support or couple to an exterior of the housing 104. The bracket assembly 1121 can include a coupling member 1122 and a member 1124 in which the coupling member 122 is affixed to a portion of the chassis 1118 and the member 1124 can be used to support or hold the housing 104 that protects and encases the container 102. As previously discussed, it is to be appreciated that the support system 1100 can include one or more bracket assemblies 1121 and each bracket assembly 1121 can include at least one of the coupling member 1122, the member 1124, or a strap 1116. It is to be appreciated that the member 1124 can be curved, bend, angled, straight or a shape selected by one of ordinary skill in the art to support a portion of the housing 104. Various configurations of the bracket assembly 1121 can be selected with sound engineering judgment and such configurations are within the scope of this subject innovation. Configurations of the bracket assembly 1121 are illustrated in FIGS. 24-30 (discussed in more detail below). It is to be appreciated that the system 1100 can use straps 1116 or be strapless. Additionally, the bracket assembly 1121 is illustrated in FIGS. 19-23.

In an embodiment, the support system 1100 can include two or more bracket assemblies 1121 to couple to or support the housing 104. In an embodiment, the bracket assembly 1121 can be in a "J" shape in which the curved member 1124 supports the housing 104. In another embodiment, the bracket assembly 1121 can be in an upside-down "J" shape in which the curved member 1124 is affixed or coupled to the housing 104. The upside down "J" configuration can provide more ground clearance. A strap 1116 can be used for each bracket assembly 1121 in which the strap 1116 provides support to secure the housing 104. For example, the strap 1116 can include a first end and a second end, wherein the first end couples to the coupling member 1122 and the second end couples to at least one of the coupling member 1122 or the curved member 1124. In an embodiment, a first strap 1116 can be positioned on an exterior of the housing 104 at a position that is in between the first inner plate 1106 and the first shield plate 1112. In the embodiment, a second strap 1116' can be positioned on an exterior of the housing 104 at a position that is in between the second inner plate 1108 and the second shield plate 1114.

In an embodiment, a first bracket assembly 1121, a second bracket assembly 1121", and a third bracket assembly 1121' can be utilized in which the first bracket assembly 1121 is on the first end 1101 and the third bracket assembly 1121' is on the second end 1103, and the second bracket assembly 1121" is in between the first bracket assembly 1121 and the third bracket assembly 1121'. Moreover, each bracket assembly can include a strap 1116. In particular, a strap 1116 on the first bracket assembly can be positioned in between a first inner plate 1106 and the first shield plate 1112. Moreover, a strap 1116' on the third bracket assembly 1121' can be positioned in between a second inner plate 1108 and the second shield plate 1114. The strap 1116" can be positioned around a circumference of the housing 104.

Figure 16:
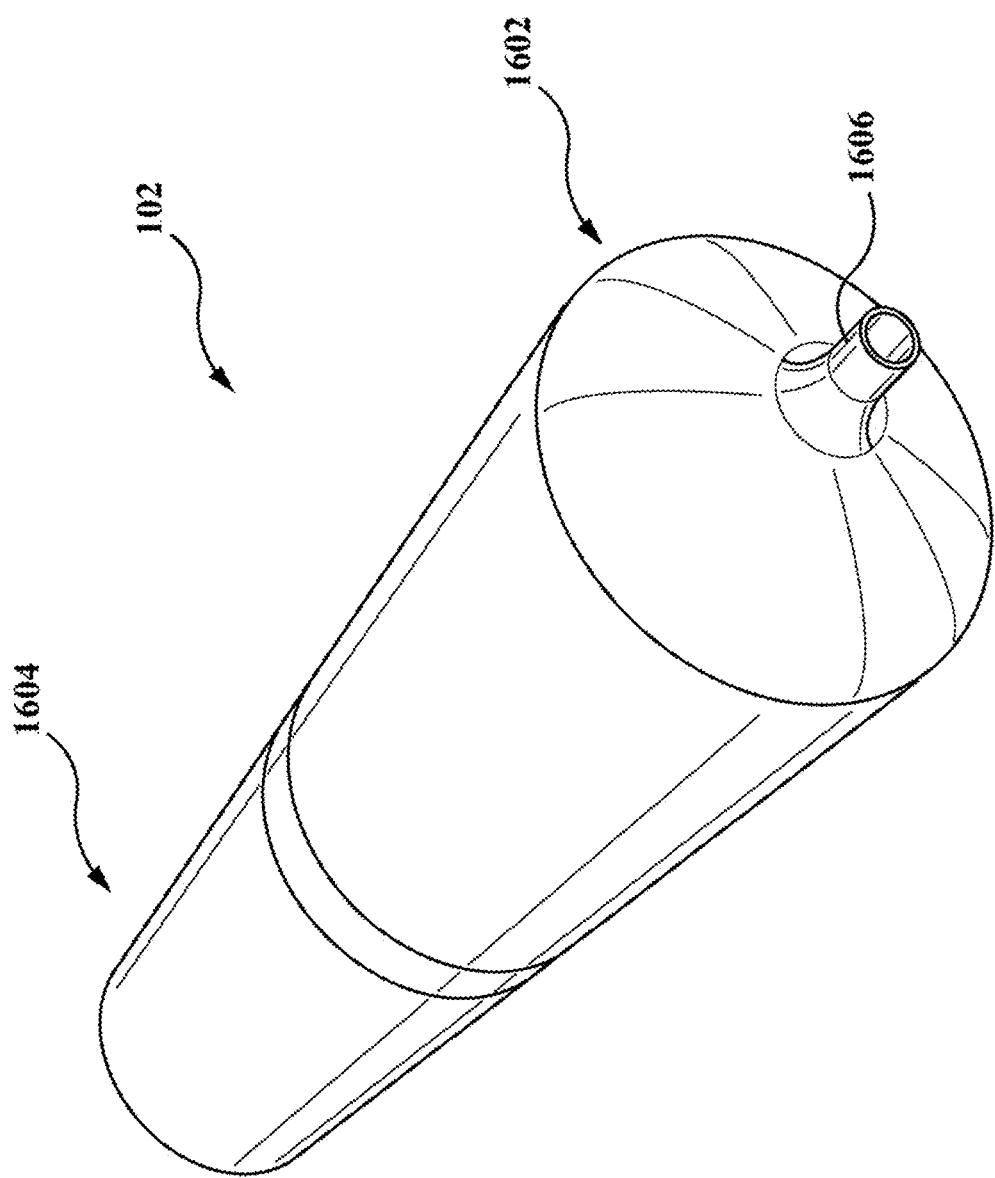
FIG. 16 is a view of a container.

Turning to FIG. 16, the container 102 is illustrated. The container 102 can include a first end 1602, a second end opposite thereto 1604, a neck 1606 located on the first end 1602 and a pressure release device (PRD) on the second end 1604. The neck 1606 can be configured to receive a valve or fitting that enables filling a portion of material and a neck opposite neck 1606 on the second end 1604 can be configured to receive a valve or fitting that enables dispensing a portion of material. It is to be appreciated that the valves on each end can be a one-way valve, a two-way valve-, among others and can be chosen with sound engineering judgment without departing from the intended scope of coverage of the embodiments of the subject invention. It is to be appreciated that the container 102 may not include a neck. It is also to be appreciated that the container 102 can include a neck on each end of the container 102 wherein at least one of the necks or both necks are threaded. It is also to be appreciated that the container 102 can include a neck on each end of the container 102 wherein at least one of the necks or both necks are not threaded. The container 102 can be cylindrical in shape with a length, a diameter, and a thickness. Yet, it is to be appreciated that the container 102 shape, materials, composition, or size can be chosen with sound engineering judgment without departing from the intended scope of coverage of the embodiments of the subject invention. The container 102 can include one or more liners of a material. For instance, the container 102 can include a liner made of a first material. In certain embodiments, the first material is at least one of a plastic, a metal, a steel, a thermoplastic, among others. In certain embodiments, the container 102 can include a wrapping of a second material. In certain embodiments, the second material is at least one of a carbon fiber, a composite material, a Teflon, or a disparate material from the first material. In certain embodiments, the container 102 is made of at least one of a metal, a plastic, a polymer, a composite material, or a combination thereof.

In an embodiment, the container 102 can include the second valve 112 on the second end 1604 and the first valve 110 on the first end 1602 opposite thereto, wherein the second valve 112 is designated to dispense a portion of material from the container 102 and the first valve 110 is designated to receive a portion of material to enter the container 102. In another embodiment, the second valve 112 can be designated to receive a portion of material to enter the container 102 and the first valve 110 can be designated to dispense a portion of material from the container 102. It is to be appreciated that the open end on the container 102 can be configured to receive material that is stored in the container 102 and/or configured to dispense material that is stored in the container 102, wherein the dispensing/receiving is with a component such as a valve, port, and the like. In another embodiment, in addition to the first valve 110 on the first end 1602 and/or the second valve 112 on the second end 1604, a PRD can be in fluid connection with the first end 1602 and/or the second end 1604, wherein the PRD can be configured to release pressure from the container 102 based on a parameter such as a pressure level, a safety event, a computer instruction to release the material in the container 102, among others.

In another embodiment, the container 102 can include a closed end on the second end 1604 and an open end opposite thereto (e.g., on the first end 1602), wherein the open end is integrated with at least one of a boss, a neck, a valve, an opening configured to couple to a valve, among others. It is to be appreciated that the open end on the container 102 can be configured to receive material that is stored in the container 102 and/or configured to dispense material that is stored in the container 102, wherein the dispensing/receiving is with a component such as a valve, port, and the like. In another embodiment, the container 102 can include a valve on the first end 1602 and a PRD on the second end 1604, wherein the PRD can be configured to release pressure from the container 102 based on a parameter such as a pressure level, a safety event, a computer instruction to release the material in the container 102, among others.

It is to be appreciated that the container 102 can include one or more valves. For instance, the container 102 can include a first valve on the first end 602 and the PRD on the second end 604. In another instance, the container 102 can include a first valve on the first end 602 and an additional valve on the second end 604 opposite thereto. Moreover, it is to be appreciated that the container 102 can include one or more chambers within to house one or more materials. For example, a cylinder can be segmented to have a first chamber that houses a first material filled/dispensed with a first valve on the first end and a second chamber that houses a second material filled/dispensed with a second valve on a second end opposite to the first end.

It is to be appreciated that the container 102 can house a portion of a material, wherein the material can be a solid, a gas, a liquid, a plasma, among others. By way of example and not limitation, the material can be an alternative fuel. In still another example that is not limiting on the subject innovation, the material can be a material at a high pressure in comparison to an atmospheric pressure.

In still another example, one or more containers 102 can be used with a fuel system for a vehicle. For example, in addition to compressed natural gas, the container 102 can be utilized with a fuel system that utilizes or consumes renewable fuel sources, nonrenewable fuel sources, liquid fuel sources, or gas fuel sources for a vehicle, wherein the container 102 can store such renewable fuel sources, nonrenewable fuel sources, liquid fuel sources, or gas fuel sources. Renewable fuel sources can include biofuels such as vegetable oil, ethanol, methanol, butanol, other bioalcohols, biomass, or biodiesel, among others. Renewable fuel sources can also include hydrogen and/or hydrogen fuel cells, refuse-derived fuel, chemically stored fuel, non-fossil methane, non-fossil natural gas, Ammonia, Formic acid, liquid Nitrogen, compressed air, or propane derived from renewable methods, among others. Nonrenewable fuel source can include gasoline, propane, or diesel, among others. Additional liquid or gas fuel sources can include any mixture or blend of energy sources, for example, E10, E15, E30, or E85 fuel, or HCNG (blend of compressed natural gas with Hydrogen). It is be appreciated that the container 102 can house a material chosen with sound engineering judgment without departing from the intended scope of coverage of the embodiments of the subject invention and such material can be used for a fuel system of a vehicle, a machine, a device, or any combination thereof.

Figure 15:
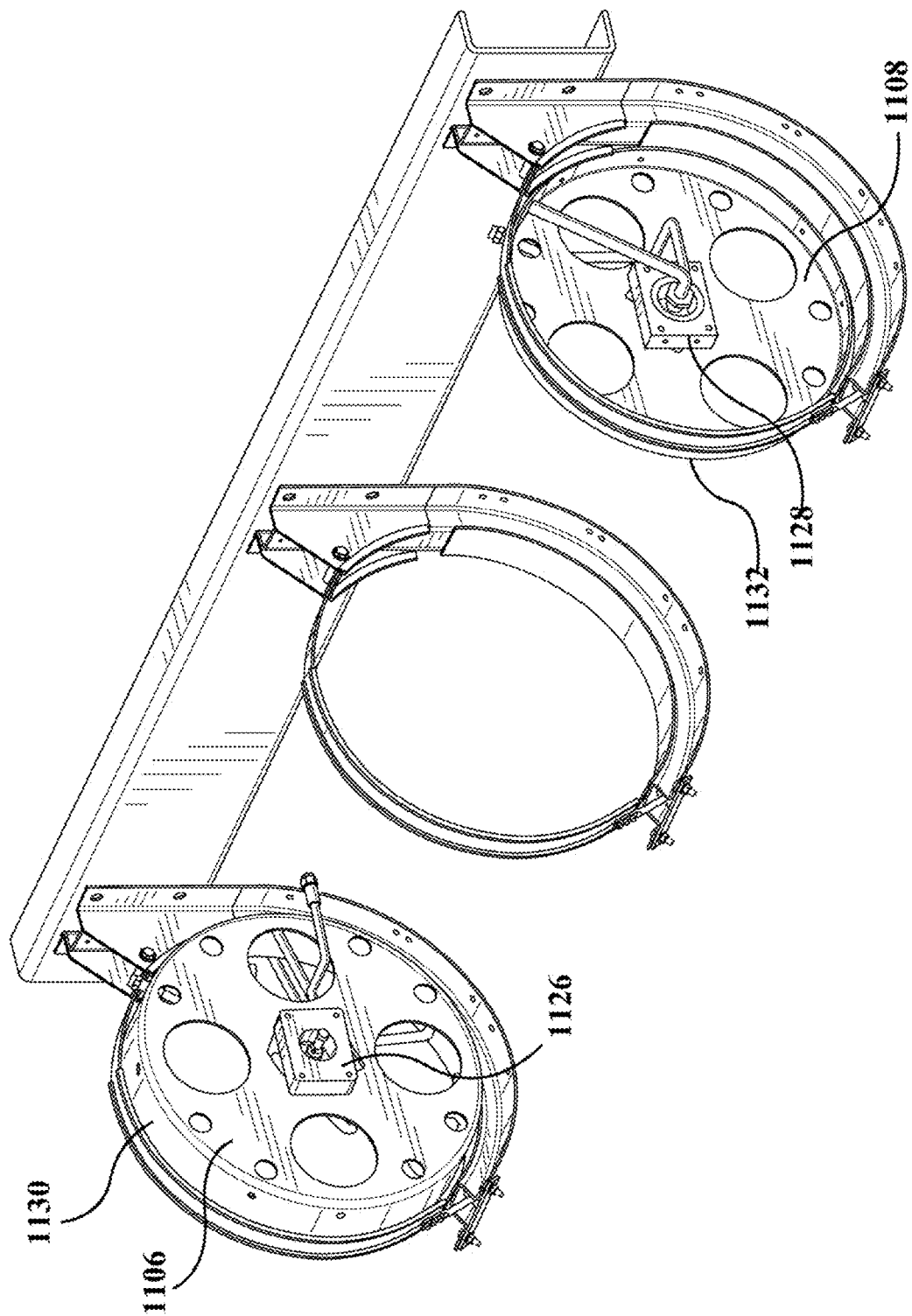
FIG. 15 is an illustration of one or more elements a support system.

Referring to FIGS. 15 and 16, the container 102 can be secured within the housing 104 with a coupling of the ends of the container 102 to one or more mounting blocks. The container 102 can include a threaded male portion on the first end 1602 of a neck 1606 of the container 102 and the container 102 is coupled to a corresponding female portion on a first neck mount 1126. The first neck mount 1126 can include the female portion such as a collar that receives the neck 1606 of the container 102. The second end 1604 of the container 102 can be inserted into a second neck mount 1128. In an embodiment, the coupling of the first end 1602 of the container 102 to the first neck mount 1126 can restrict movement whereas the second neck mount 1128 can be configured to enable movement in a longitudinal direction from the first end 1602 to the second end 1604 based on a pressure change or a temperature change of the material in the container 102. In particular, the change in pressure or temperature of the material can result in an expansion or contraction of the container 102 and the support system 1100 can accommodate such to prevent deterioration of the support system or components thereof. In another embodiment, the coupling of the first end 602 of the container 102 to the first neck mount 1126 can restrict movement and the coupling of the second end 1604 of the container 102 to the second neck mount 1128 restrict movement. In still another embodiment, the coupling of the second end 1604 of the container 102 to the second neck mount 1128 can restrict movement whereas the first neck mount 1126 can be configured to enable movement in a longitudinal direction from the first end 1602 to the second end 1604 based on a pressure change or a temperature change of the material in the container 102.

The support system 1100 allows a twisting motion of the container 102 from change in pressure or temperature or from motion/movement of the vehicle to which the bracket assemblies are attached. The support system 1100 also provides protection in a roll situation for the vehicle in which the container 102 is bolted to a portion of the support system 1100 with a bolting to the neck 1606, one or more straps 1116 (e.g., 6 inch straps), and/or a channel around a portion of the housing 104 for each straps with bolting accessible at the end of the straps. For instance, the bolting on the straps can be accessible on a bottom side of the vehicle when the support system 1100 is oriented in a horizontal position (compared to ground).

The first neck mount 1126 can be coupled to a first inner plate 1106 and the second neck mount 1128 can be coupled to a second inner plate 1108. The first inner plate 1106 can include one or more apertures and/or a center aperture for the neck 1606 of the container 102 as well as the first neck mount 1126 and at least one of a valve, pressure release device, a tubing, a connector, etc. The second inner plate 1108 can further include apertures and/or a center aperture for the second end 1604 of the container as well as the second neck mount 1128 and at least one of a valve, pressure release device, a tubing, a connector, etc. The material stored or housed in the container 102 can be delivered to the vehicle or an engine of the vehicle via one or more valves, connectors, tubing, etc. Moreover, the container 102 can be filled with the material via a valve, tubing, connectors, etc.

The first inner plate 1106 can have a thickness and include a front side, a backside, and a sidewall that is in contact with an inside wall of the housing 104. Further, the second inner plate 1108 can have a thickness and include a front side, a backside, and a sidewall, wherein the sidewall is in contact with an inside wall of the housing 104. It is to be appreciated that the sidewall of the first inner plate 1106 and the sidewall of the second inner plate 1108 can be coupled to the inside wall of the housing 104 with at least one of a welding, adhesive, screw, nut/bolt, threading, or a combination thereof. The back side of the first inner plate 106 can be in contact with and coupled to the first neck mount 1126. The back side of the second inner plate 1106 can be in contact with and coupled to the second neck mount 1128.

Figure 17:
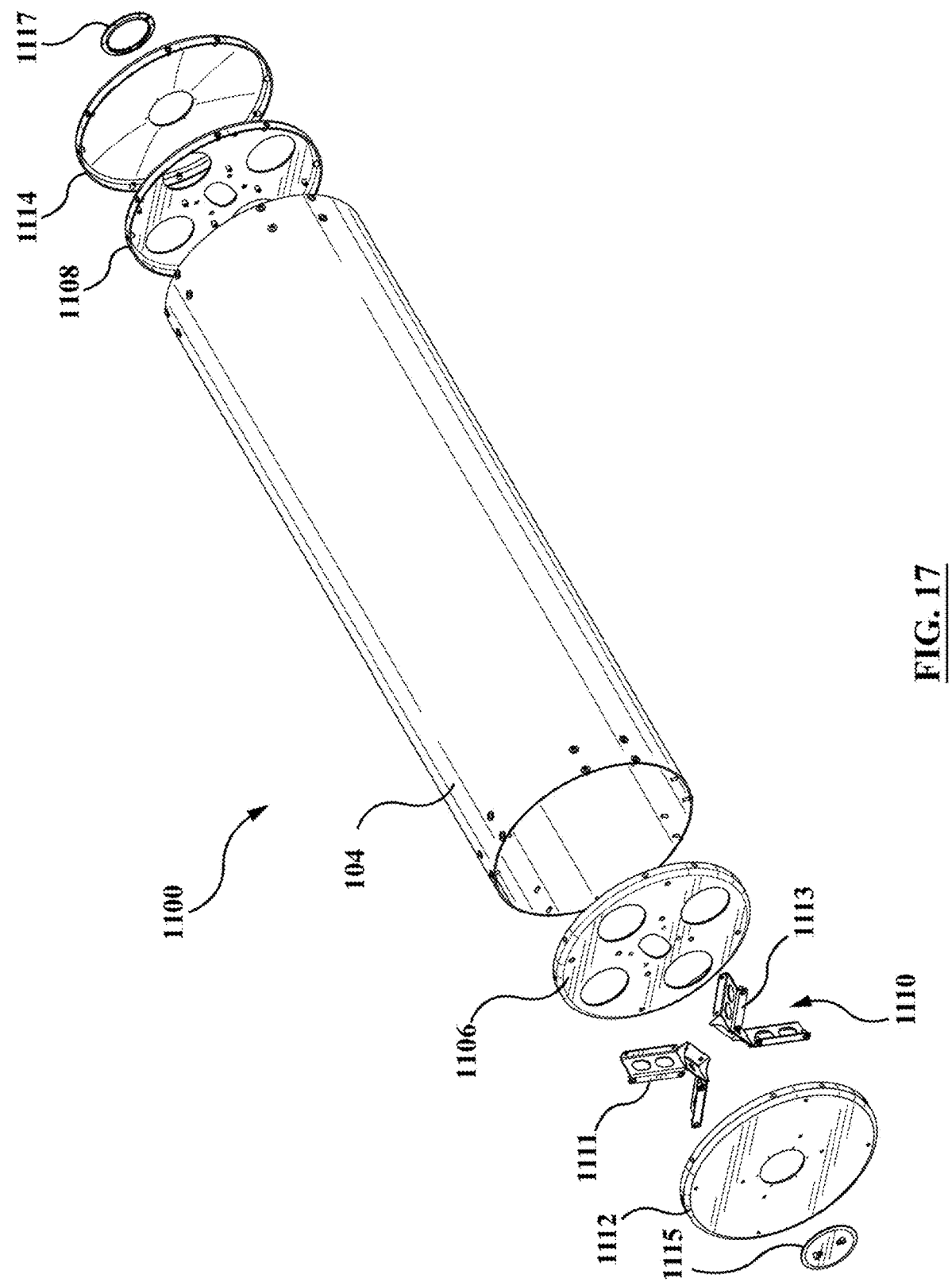
FIG. 17 is an exploded view of an integrated fill system that includes a housing, first inner plate, second inner plate, truss assembly, first shield plate, second shield plate, and end caps.
Figure 18:
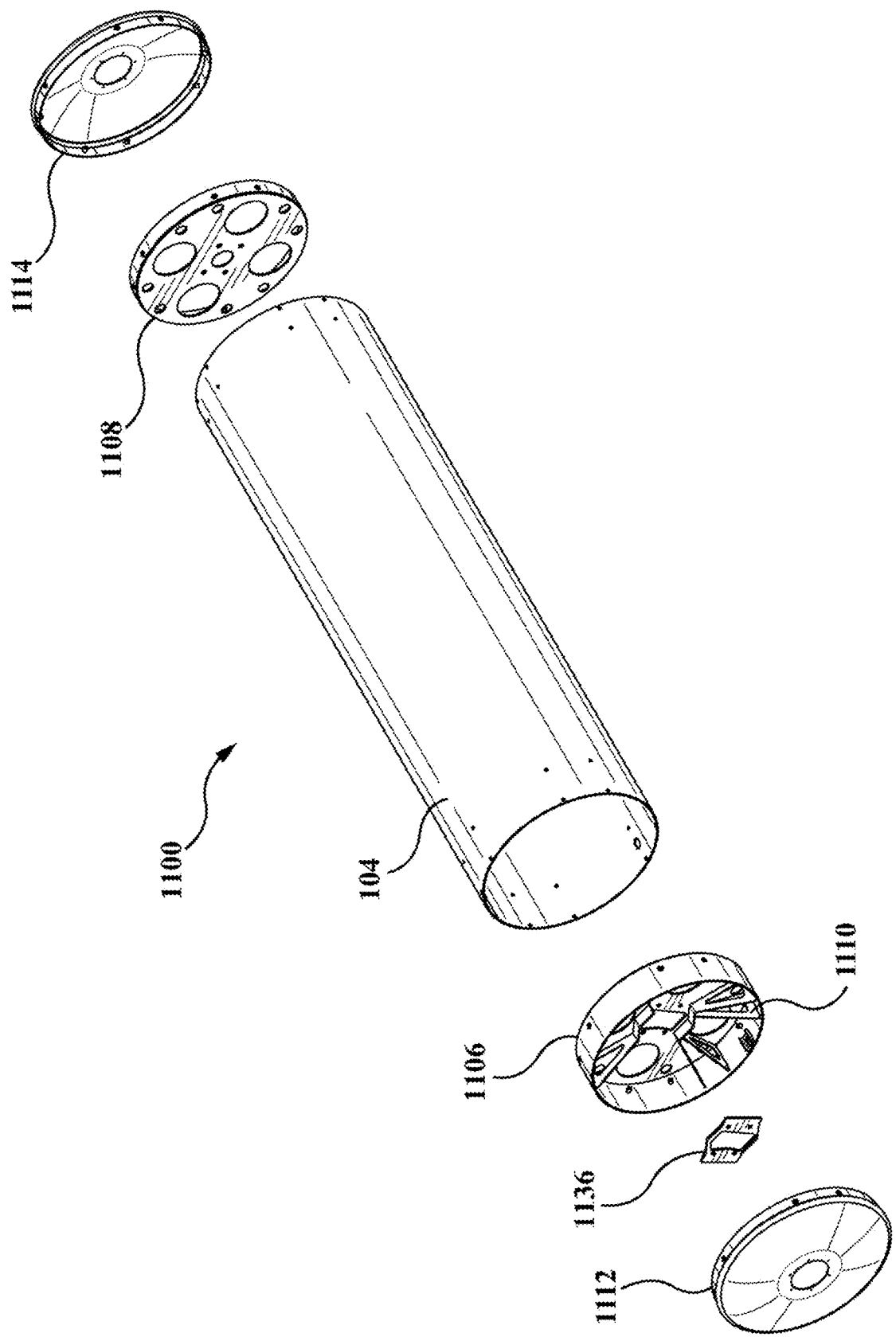
FIG. 18 is an exploded view of an integrated fill system that includes a housing, first inner plate, second inner plate, truss assembly integrated into the first inner plate, first shield plate, and second shield plate.
Figure 19:
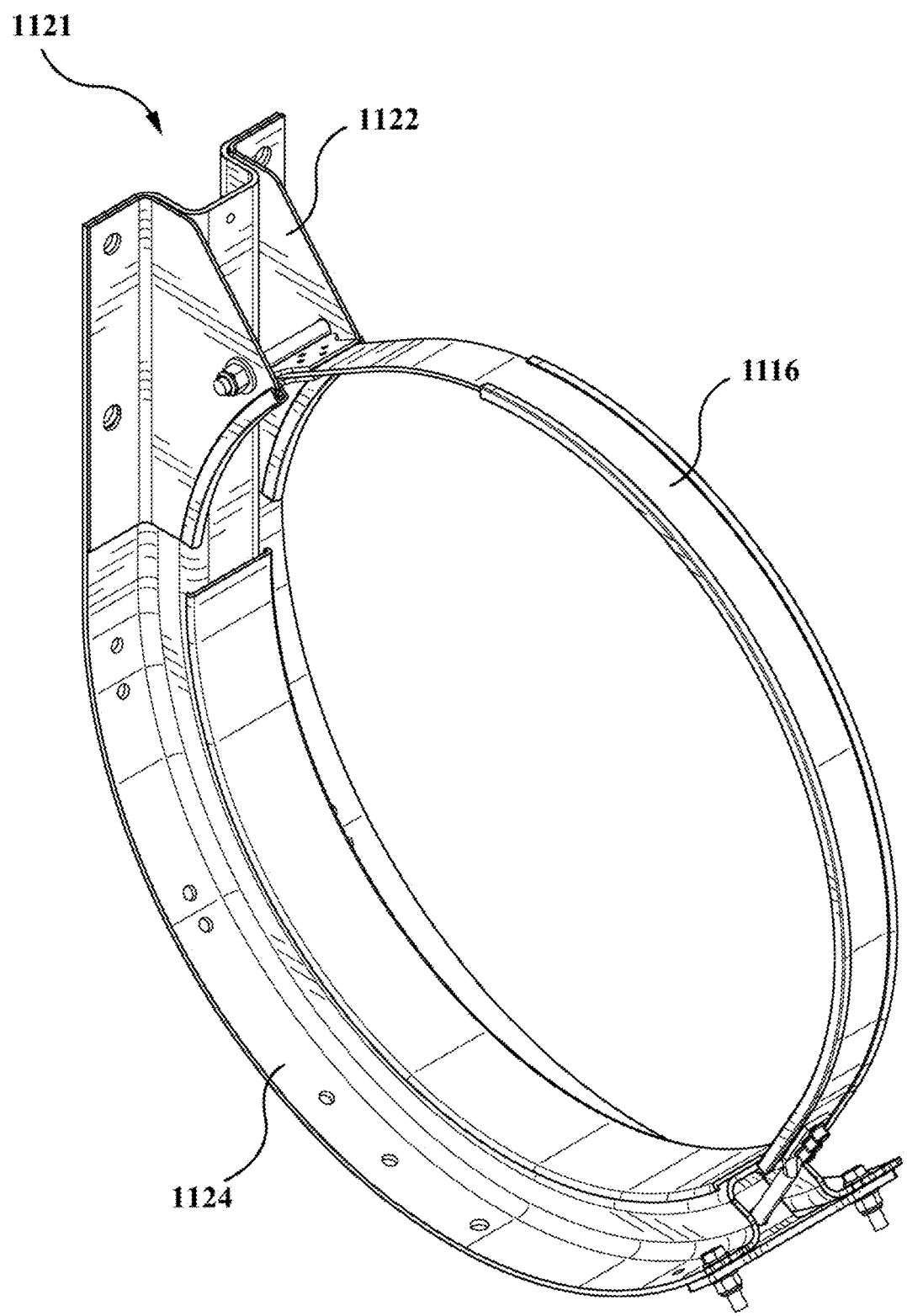
FIG. 19 is an illustration of perspective view of a bracket assembly and strap.
Figure 20:
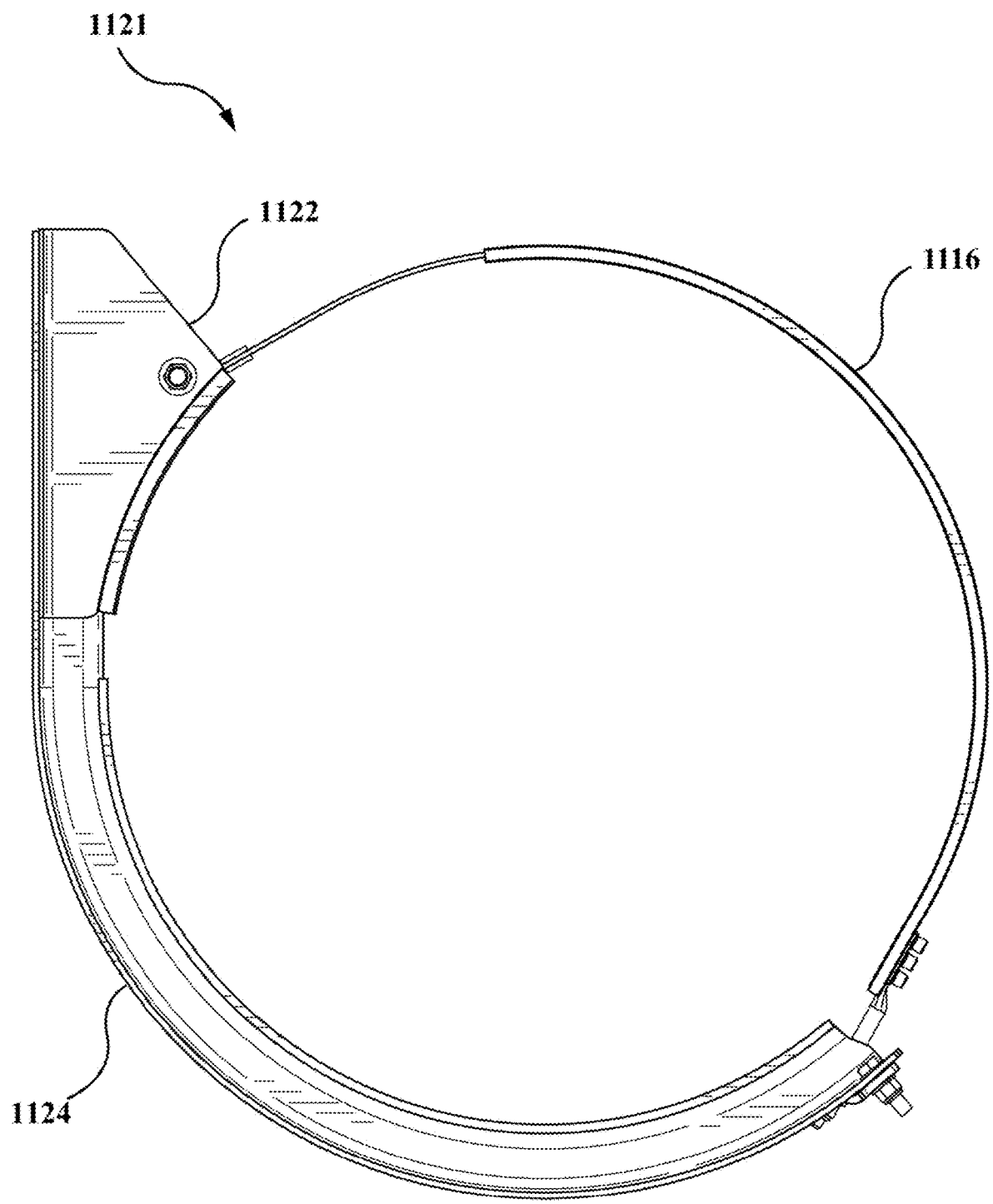
FIG. 20 is an illustration of side view of a bracket assembly and strap.
Figures 21, 22:
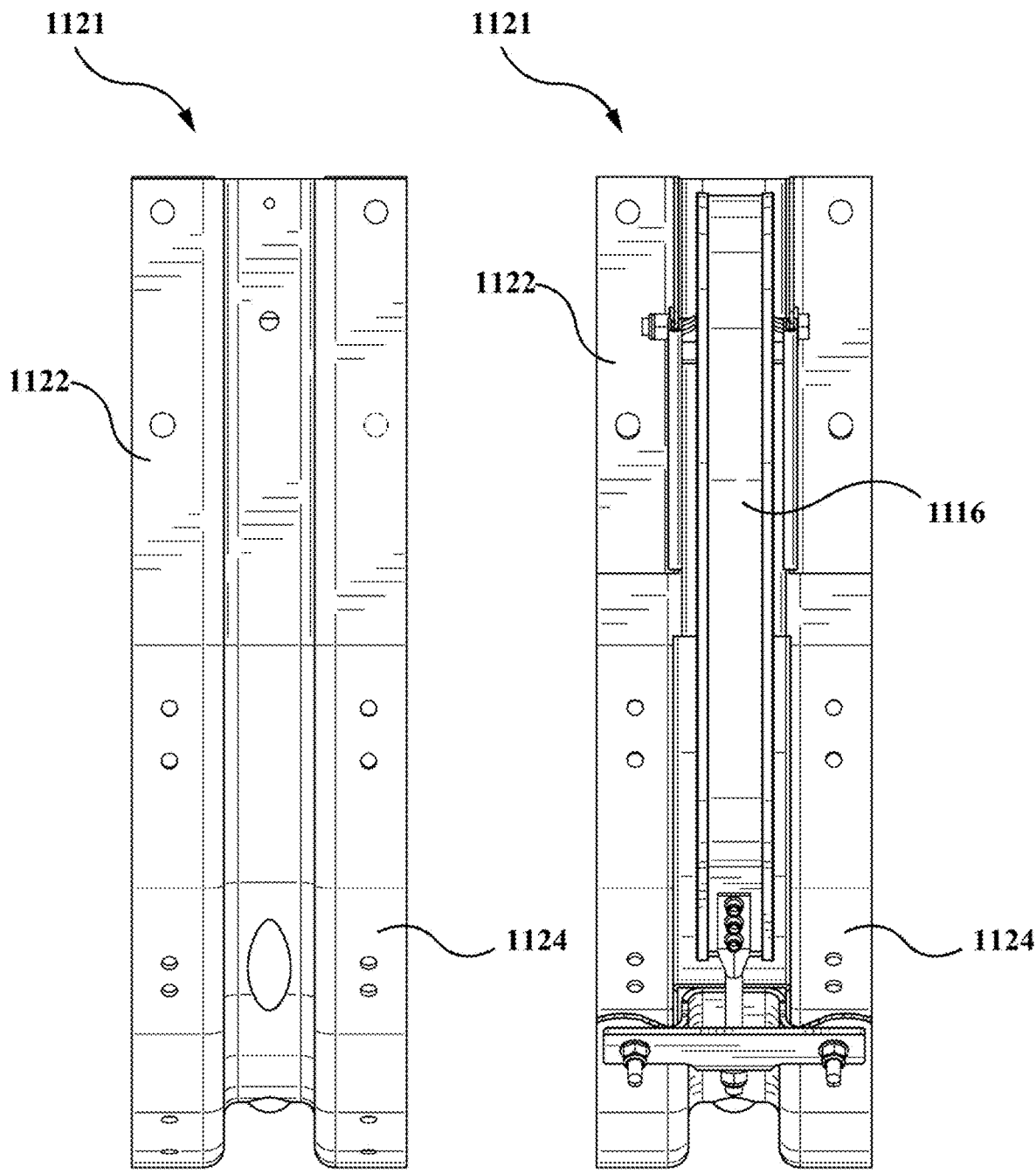
FIG. 21 is an illustration of rear view of a bracket assembly and strap.
FIG. 22 is an illustration of front view of a bracket assembly and strap.
Figure 23:
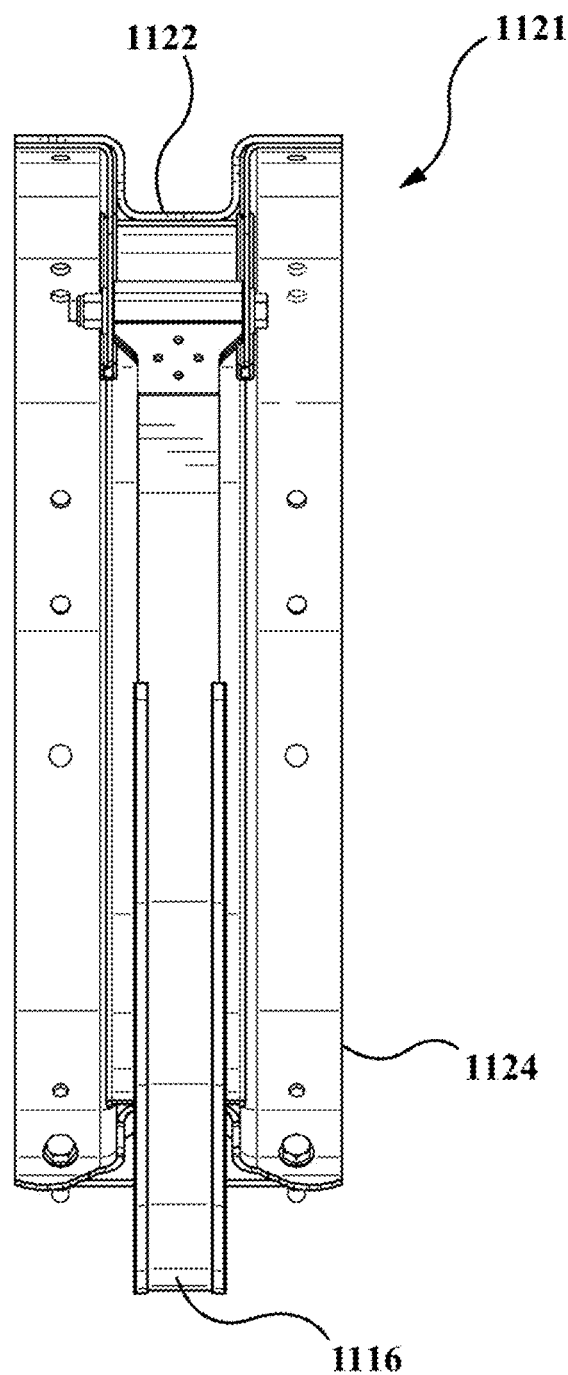
FIG. 23 is an illustration of top view of a bracket assembly and strap.
Figure 24:
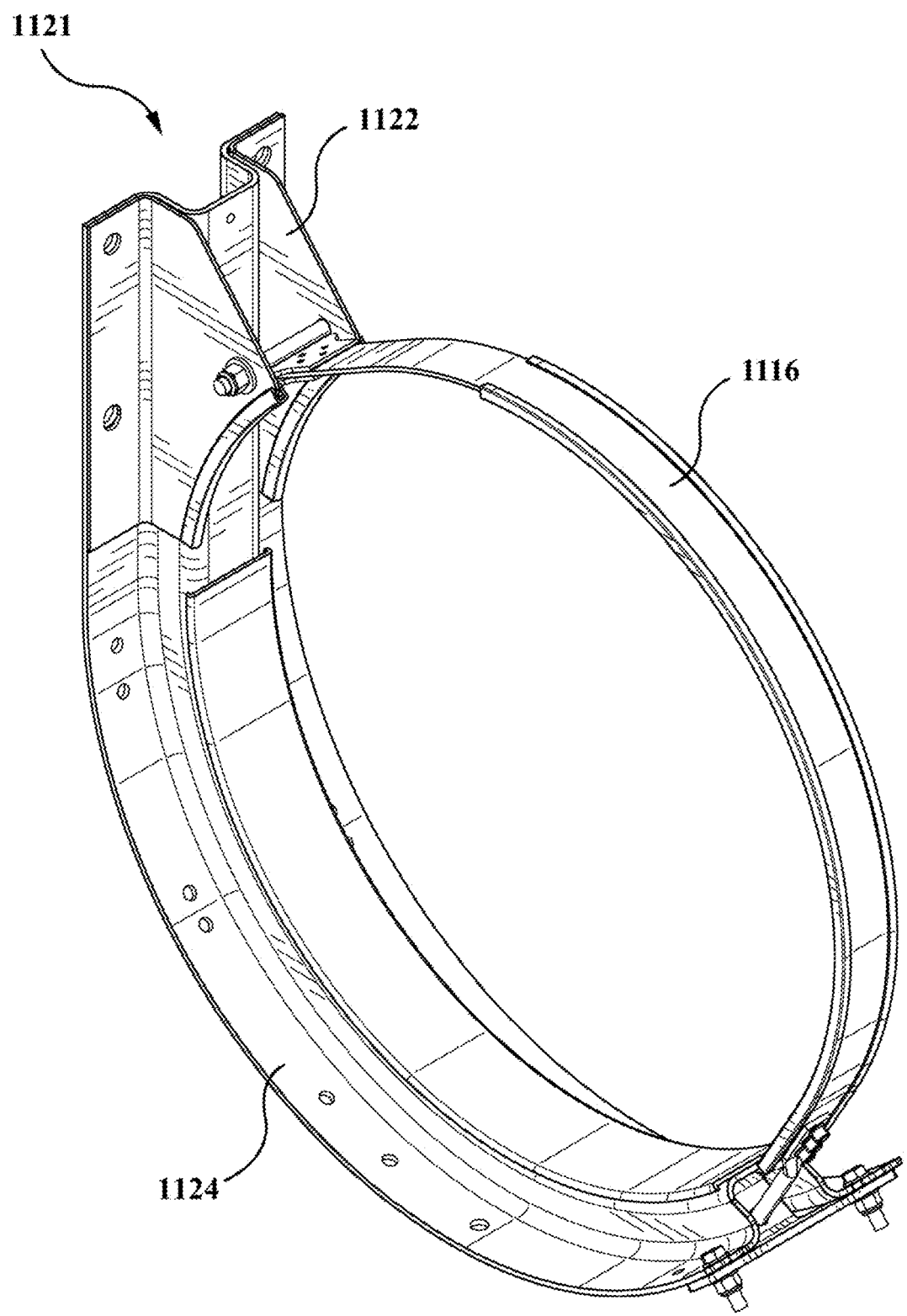
FIG. 24 is an illustration of a bracket assembly.
Figure 25:
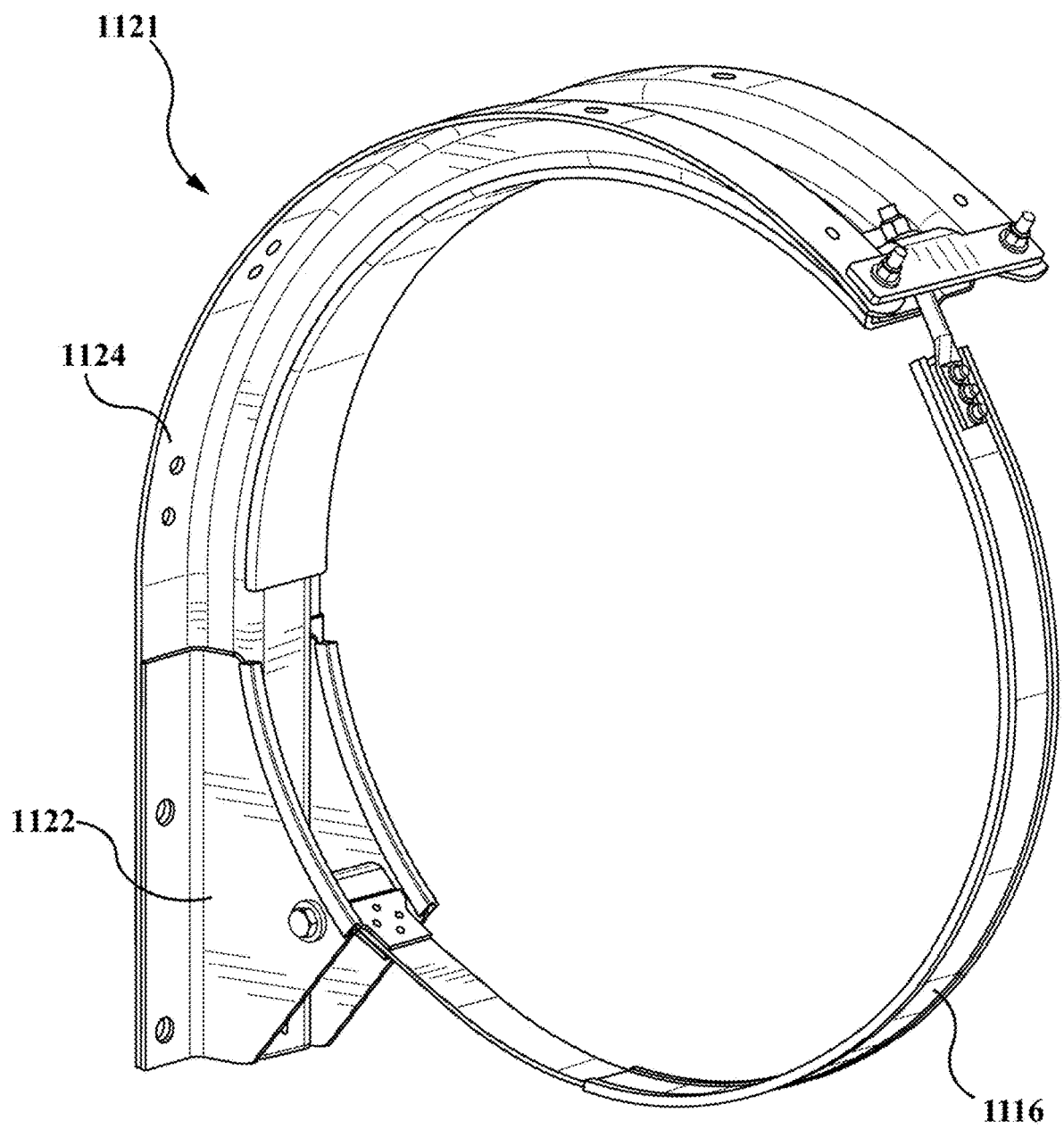
FIG. 25 is an illustration of a bracket assembly.
Figure 26:
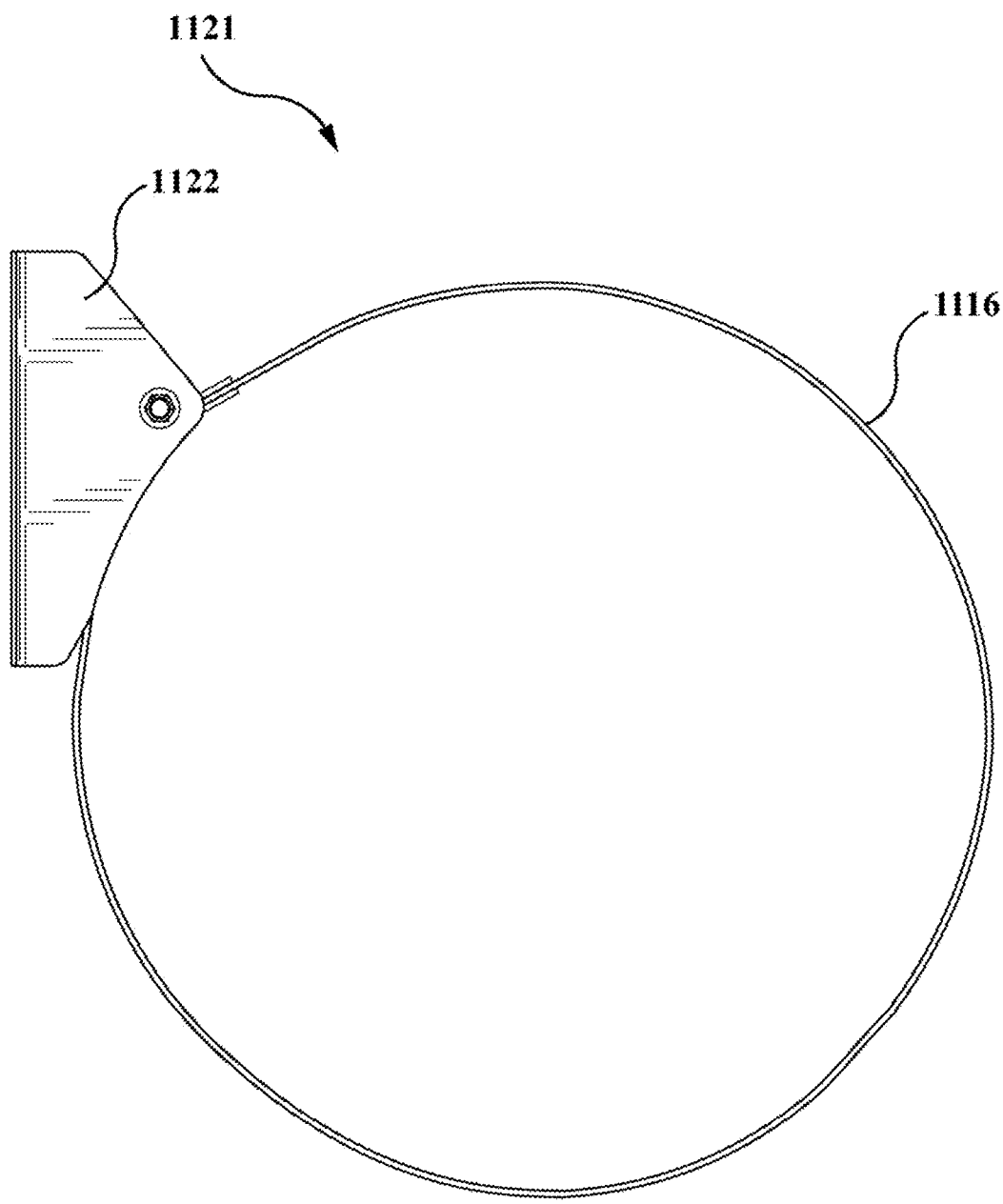
FIG. 26 is an illustration of a bracket assembly.
Figure 27:
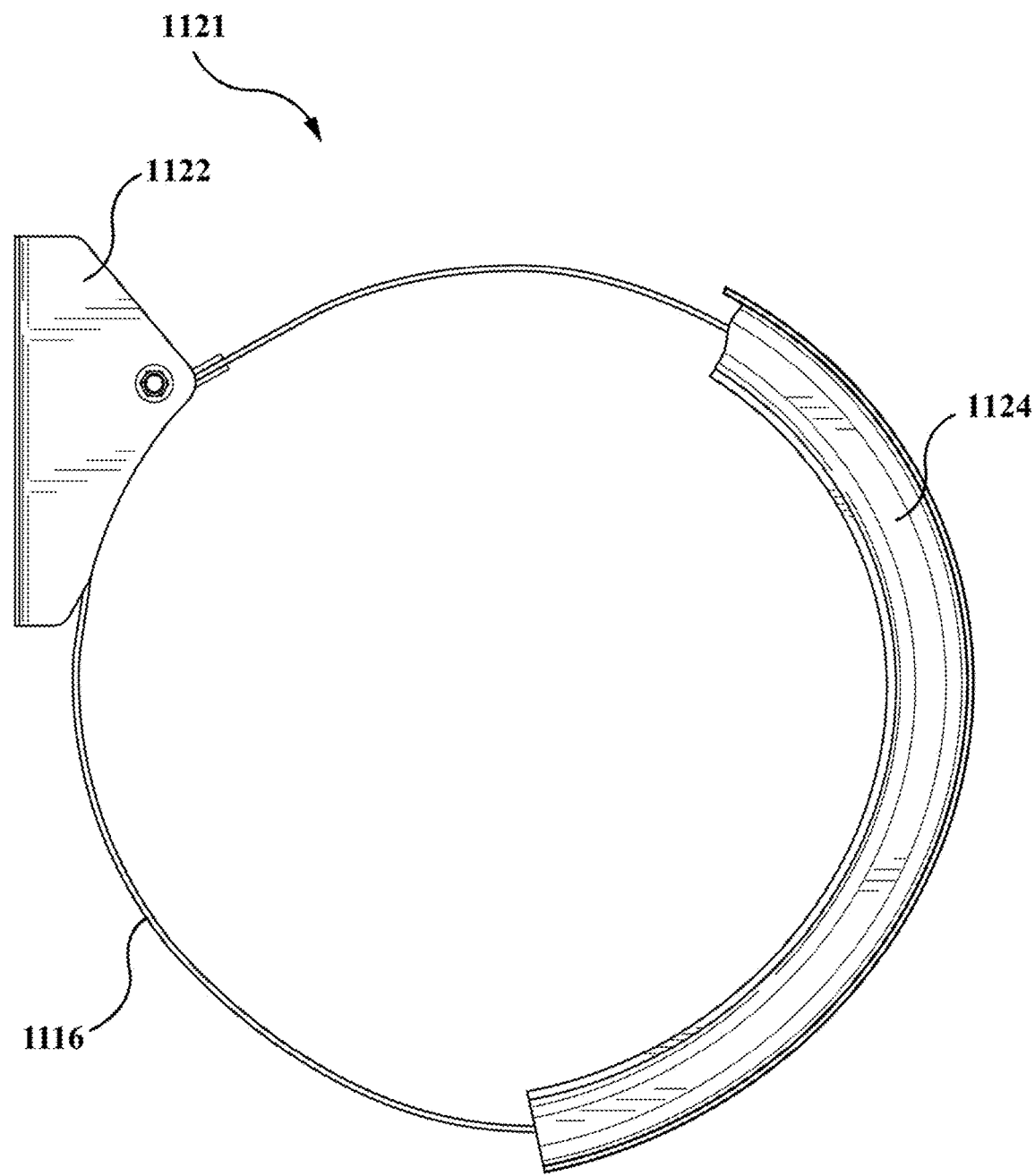
FIG. 27 is an illustration of a bracket assembly.
Figure 28:
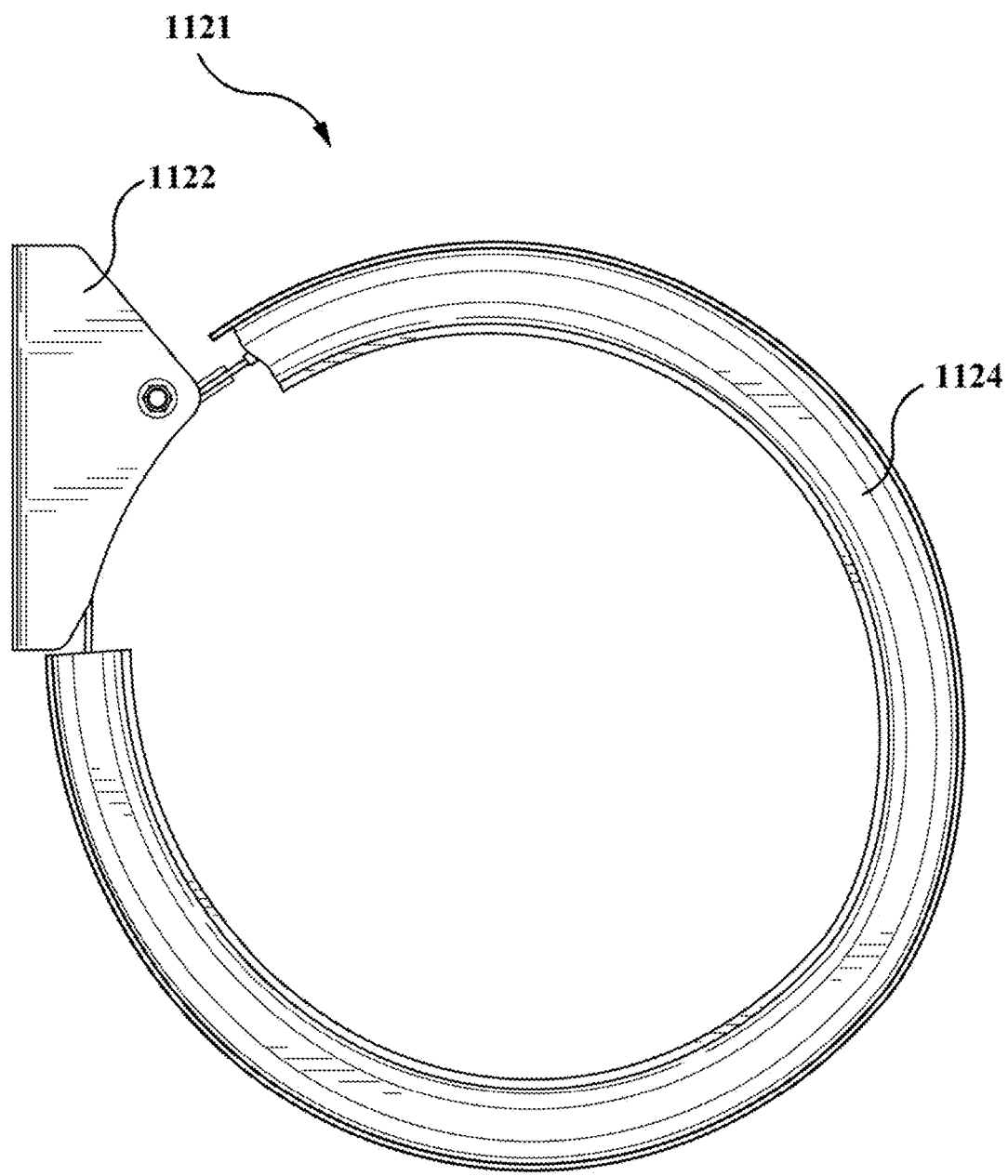
FIG. 28 is an illustration of a bracket assembly.
Figure 29:
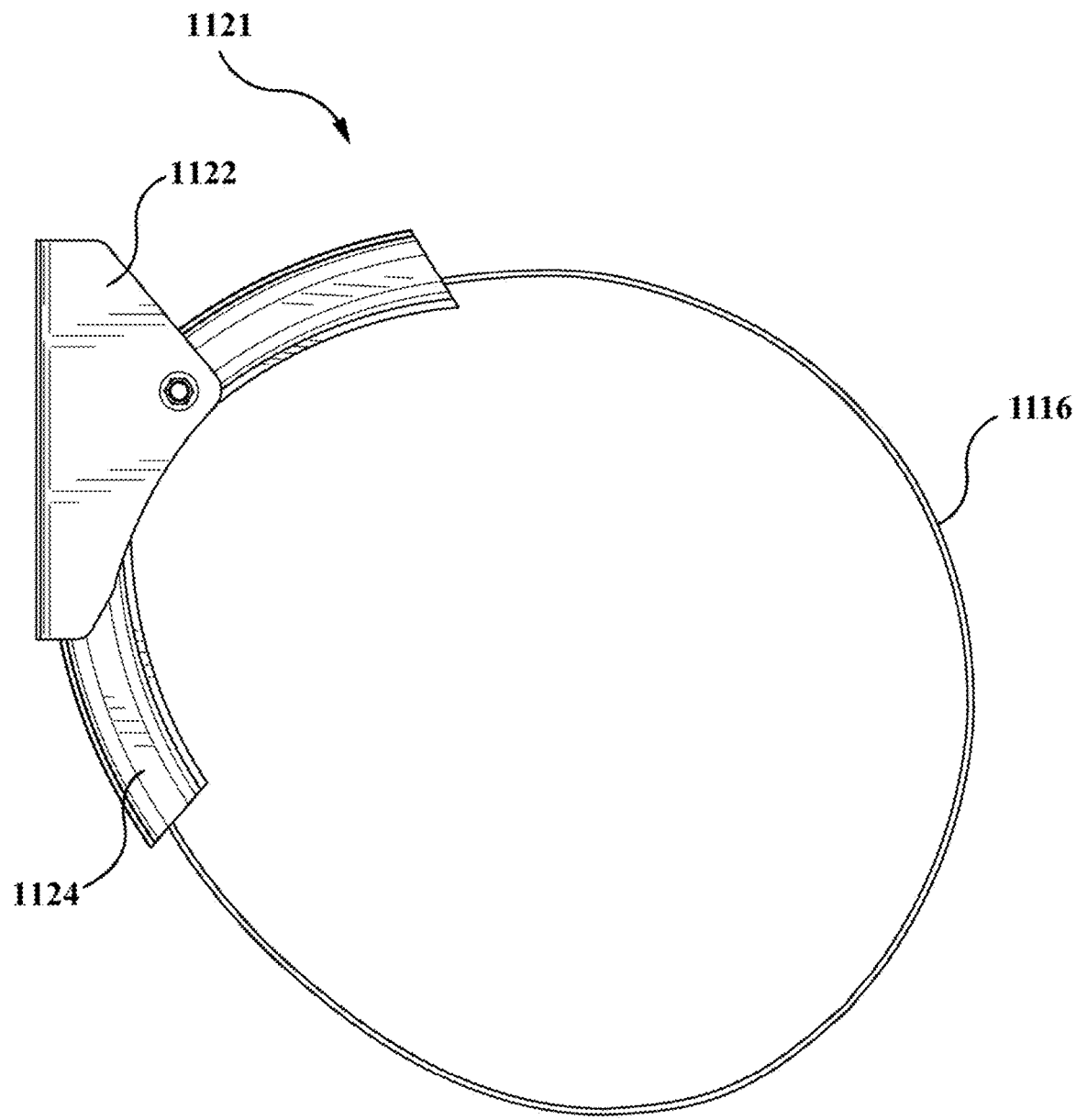
FIG. 29 is an illustration of a bracket assembly.
Figure 30:
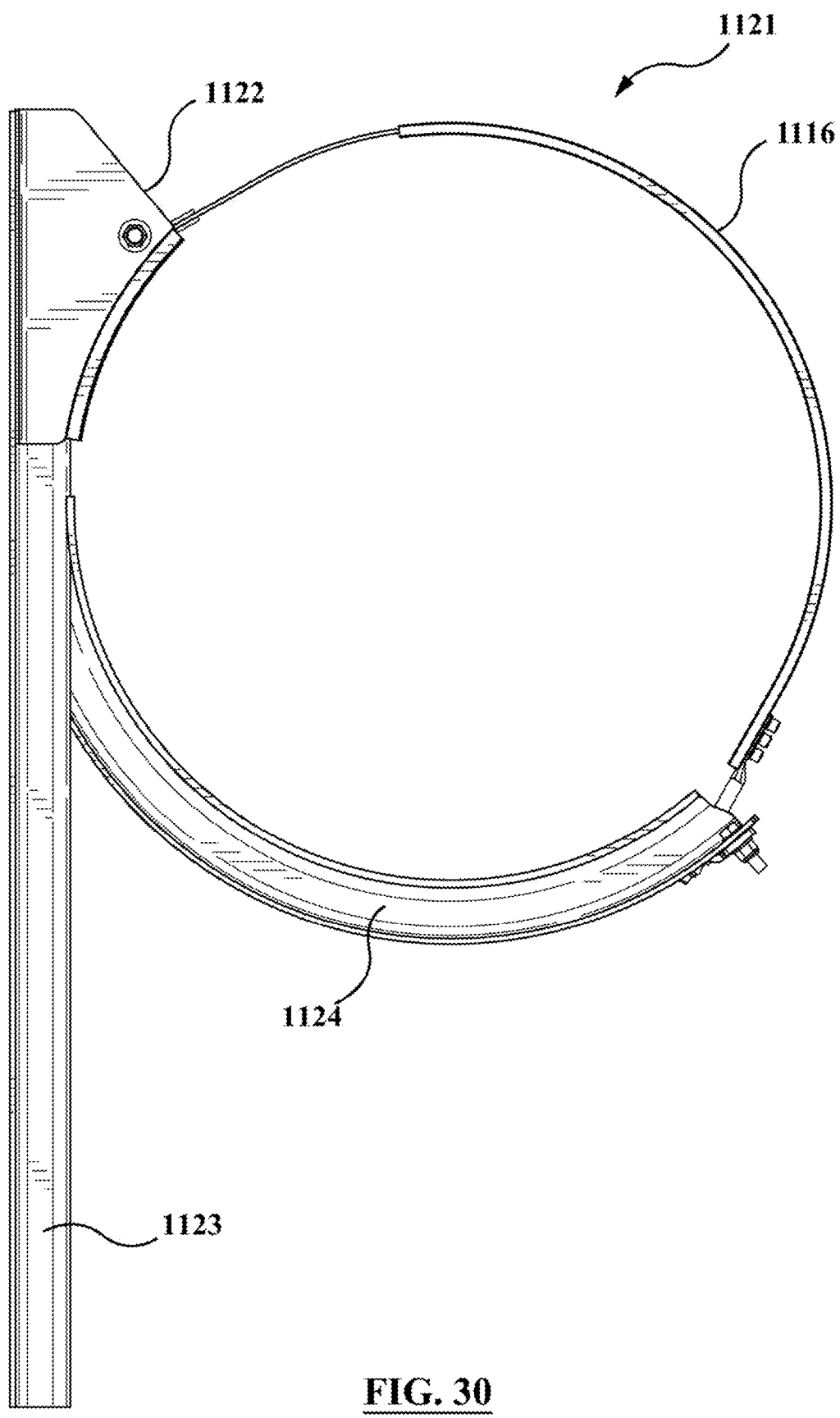
FIG. 30 is an illustration of a bracket assembly.

FIGS. 17 and 18 are exploded views of embodiments of the subject innovation. In particular, FIGS. 17 and 18 illustrate the housing 104, the first inner plate 1106, the second inner plate 1108, a truss assembly 1110, the first shield plate 1112, the second shield plate 1114, a first end cap 1115, and a second end cap 1117. It is noted that FIGS. 17 and 18 do not illustrate the container 102 that is encased and protected by the housing 104.

The truss assembly 1110 can be coupled to the front side 1138 of the first inner plate 1106, wherein the front side 1138 is opposite the back side of the first inner plate 1106 and is coupled to the first neck mount 1126. In another embodiment, the support system 1100 can include a first truss assembly 1110 coupled to the first inner plate 1106 and a second truss assembly coupled to a second truss assembly coupled to the second inner plate 1108.

In an embodiment, the truss assembly 1110 can be included on the first inner plate 1106, the second inner plate 1108, or a combination thereof. In another embodiment, the first inner plate 1106 or the second inner plate 1108 can be excluded within the support system 1100 (and in particular within the housing 104) but can include the truss assembly 1110 on one or more ends of the housing 104.

It is to be appreciated that the truss assembly 1110 can be releasably coupled to the first inner plate 1126 as illustrated in FIG. 17. For instance, the truss assembly 1110 can include a first portion and a second portion. In an embodiment, the truss assembly 1110 can include a first portion and a second portion as separate components but can also be included as a single component without departing from the scope of the subject innovation. The first portion can include a mount member with two (2) extending arms, wherein the mount member can be coupled to at least one of the first inner plate 1106, the first neck mount 1126, or the first shield plate 1112. The two extending arms of the first portion can be coupled to at least one of the first inner plate 1106, the first neck mount 1126, or the first shield plate 1112. Similarly, the second portion can include a mount member with two (2) extending arms, wherein the mount member can be coupled to at least one of the first inner plate 1106, the first neck mount 1126, or the first shield plate 1112. The two extending arms of the second portion can be coupled to at least one of the first inner plate 1106, the first neck mount 1126, or the first shield plate 1112. It is to be appreciated that the truss assembly 1110 can include apertures for structural integrity as well as to reduce weight thereof.

In an embodiment in which a truss assembly can be included on the second end 1604 of the container 102 and the second end 1103 of the housing and such coupling to can be similar to the truss assembly 1110 discussed above without departing from the scope of the subject innovation.

Further, it is to be appreciated that the truss assembly 1110 can be coupled directly to the first inner plate 1106 with one or more welds as illustrated in FIG. 18. For instance, the truss assembly 1110 can be integrated into the first inner plate 1106. The truss assembly 1110 can include one or more gussets. In particular, the truss assembly 1110 can include a first gusset and a second gusset. It is to be appreciated that the truss assembly 110 can include one or more gussets, wherein each gusset is a separate component or aggregated to be a single component. Additionally, the truss assembly 1110 can include angles associated with the first gusset and the second gusset. The first gusset can be a "W" shape or can be selected with a shape with sound engineering without departing from scope of the subject innovation. The second gusset can be a "W" shape with two additional features within the outer arms of the existing "W" shape.

Continuing with the embodiment illustrated in FIG. 18, a reinforcement plate 1136 is coupled on the front side of the first inner plate 1106. The reinforcement plate 1136 can include one or more apertures for coupling as well as an aperture for at least one of the neck 1606, a valve, a tubing, a connector, among others.

The support system 1100 can further include a pressure release device (PRD). A PRD is a device adapted to sense one or more physical parameters, such as, without limitation, pressure, temperature, or stress, within or around a container 102 and to vent the contents of the container 102 to environment if the one or more physical parameters meet a predetermined standard. In one embodiment a PRD may be adapted to sense pressure within a container 102 and to vent the contents of the container 102 to environment if the pressure is more than some predetermined pressure. In some non-limiting embodiments, the predetermined pressure may be 50% of the maximum pressure a container 102 may contain without bursting or otherwise failing.

The support system 1100 is a non-limiting embodiment that includes one or more containers 102 that are configured to house a material, each container 102 may be cylindrical in shape with a length, a diameter, and the first end 1602 opposite a second end 1604 in which the one or more of the ends can include at least one of a valve or a PRD. It is to be appreciated that the first end or the second end can include one or more valves and/or PRDs.

It should be understood that in other acceptable embodiments the orientation of the one or more containers 102 need not be horizontal; the containers 102 may be vertical or in some other orientation or position in between a horizontal position and a vertical position (e.g., an angle between 0 and 90 degrees comparative to the ground), such as, without limitation, slanted.

As discussed, the container can be neck mounted, that is mounted at one or more necks of the container 102. It is to be appreciated that the container 102 can include a neck on at least one end of the container 102. A neck mount provides for substantially stress free container expansion and/or contraction. A neck mount may comprise a mounting block having an internal geometry adapted to engage with the neck of a container 102 and an external geometry adapted to engage with a block receiver. In particular, a face of the first neck mount can be coupled to the first inner plate and a face of the second neck mount can be coupled to the second inner plate.

It should be understood that the internal geometry of the mounting block can be adapted to accept a wide variety of shapes of a neck including, but not limited to, cylindrical, cuboid, prismatic, polyhedral, or otherwise. It should be understood that the external geometry of the mounting block and the block receiver can be any of a wide variety of shapes including, but not limited to, cylindrical, prismatic, or otherwise. It should be understood that the fit between the neck of container 102 and the internal geometry of mounting block may be a tight fit or press fit or other fit adapted to prevent slippage between the neck and the internal geometry, or may be a loose or clearance or other fit adapted to permit slippage between the neck and the internal geometry. It is further to be appreciated that a neck mount can be used on each end of the container 102 for each container 102 used in support system 1100.

Turning now to FIGS. 30-36, the bracket assembly 121 is illustrated with various arrangements of the coupling member 122, one or more curved members 124, and/or one or more straps are depicted in accordance with one or more embodiments. For instance, in FIG. 32, the bracket assembly 121 includes a coupling member 122 attached to a strap 116 configured to loop around and secure a tank. According to another aspect, as depicted in FIG. 33, the bracket assembly 121 can include a coupling member 122 attached to a strap 116 which carries a curved member 124. The curved member 124 can provide a rigid support for a tank and operates with the strap 116 to secure the tank. In one example, the curved member 124 attaches to the coupling member 122 via a single strap 116 that loops through the curved member 124. In another example, the coupling member 122 couples to the curved member 124 via two straps 116 respectively attached to each end of the curved member 124.

In yet another example, as shown in FIG. 34, the coupling member 122 couples to one or more curved members 124 to form a loop for securing a tank. The one or more curved members 124 can attach directly to the coupling member 122 or, alternatively, can attach to the coupling member 122 via one or more straps 116 or portions thereof. Further, it is to be appreciated, for example, that one end of the loop can include the curved member 124 directly attached to the coupling member 122, while the other end of the loop attaches the curved member 124 to the coupling member 122 via a strap 116 or portion thereof. According to another aspect depicted in in FIG. 35, the curved member 124 mounts to the coupling member 122 at a point of an arc of the curved member 124 located between the ends of the curved member 124. The ends of the curved member 124 can couple to a strap 116 configured to loop around and secure a tank. In yet another example, the bracket assembly 121 illustrated in FIG. 36 includes a coupling member 122 having an elongated extension member 123. The curved member 124 attaches to the coupling member 122, at one end for example, and further attaches to a strap 116 at another end. The strap 116, in turn, couples to the coupling member 122 thereby forming a loop for securing a tank. The extension member 123 can extend from the coupling member 122 in a direction below or above the coupling member 122, and substantially tangential to the loop, to provide an extended mounting surface.

As seen in FIGS. 31-33, the support system 1100 can mount to a structure on a vehicle 200 or a portion of the vehicle. In an embodiment, the support system 1100 can be coupled to the chassis or frame 1118 of the vehicle 200. For example, as shown in FIGS. 31 and 32, the support system 100 can be mounted to a portion of a cabin 202 of the vehicle in a horizontal orientation compared to a ground level (FIG. 31). In another example, the support system 100 can be mounted to a portion of a cabin 202 of the vehicle in a vertical orientation compared to a ground level (FIG. 32). It is to be appreciated the vehicle 200 can include one or more support systems 1100 in various configurations (e.g., first support system in a horizontal orientation and a second support system in a vertical orientation, or a support system in a position that is in between horizontal and vertical). In another example, illustrated in FIG. 33, the support system 1100 can be mounted to the chassis or frame 1118 so that the container 102 within the housing 104 can be supported beside or beneath the frame 1118.

At least one of the straps 1116 or the housing 104 can be configured to receive an entry step to allow a user to enter/exit a door of the vehicle. In particular, a step bracket or a step can be coupled to a portion of one or more of the straps 1116. In another example, a portion of a step bracket or a step can be coupled to a portion of the housing 104. At least one of the entry step, the entry step bracket, or the housing 104 can be designed to be affixed with aerodynamic fairing packages or aerodynamic features to aid in aerodynamics.

In certain embodiments, the support system 1100 includes an electrical connector component that couples to at least one of an electrical component of the vehicle. For example, and without limitation, in conventional vehicles, there is typically an electrical system comprising one or more of an alternator or other electrical generator and a battery or other energy storage device adapted to supply electrical energy. Known methods and apparatuses for operationally engaging the electrical system of a vehicle may be adapted for use with system 1100 in order to provide an electrical connector component that may be used to readily couple with the electrical system of vehicle. An electrical connector component coupled with the electrical system of vehicle may be used to supply the support system 1100 with electrical energy.

In certain embodiments, the support system 1100 includes a fuel connector component adapted to fluidly communicate with at least one of a hose of the vehicle or a fuel line of the vehicle, wherein the fuel connector component is adapted to output of a portion of the material from the one or more containers 102 to a portion of an engine of the vehicle. Moreover, supply lines or conduit can be used to deliver a material stored in the container to an engine or area of the engine in the vehicle.

The support system 1100 can utilize one or more manifolds, and in particular, a first manifold on a driver side of the vehicle and a second manifold on a passenger side of the vehicle. In such embodiments, first manifold may comprise a fast-fill port adapted to receives a portion of the material contained within one or more containers 102 at a first rate of flow; a fill port adapted to receives a portion of the material contained within one or more containers 102 at a second rate of flow, wherein the first rate of flow is greater than the second rate of flow; a fuel transfer port configured for fluid communication of a portion of the material between a container affixed to a second vehicle and the one or more containers 102 of the first vehicle and also configured for fluid communication of a portion of the material between the one or more containers 102 of vehicle and an external storage container (not integral to the vehicle) such as, without limitation, a storage container at a garage, depot, or other site; and a transfer valve that is configured to control flow for the fuel transfer port. The manifold can include a shut-off valve, an internal check valve, an inlet fitting, a fuel storage fitting, a coalescing filter, and a pressure gage. In certain embodiments, a first container is in selectable fluid communication with a second container. This latter selectable fluid communication may adapted for control by a valve.

Generally, a container 102 may be any kind of container chosen with good engineering judgment and may, without limitation, consist of or comprise a cylinder, a tank, a housing, or a canister. The vehicle may be any kind of vehicle chosen with good engineering judgment and may, without limitation, be selected from the group consisting of a semi, a semi truck, a semi-trailer truck, a tractor-trailer, a transfer truck, an 18-wheeler, a truck, a class 8 vehicle, an automobile, farm equipment, industrial equipment, construction equipment, van, Sport Utility Vehicle (SUV), a truck that carriers a load and/or freight, a bus, and the like.

It is to be appreciated that the support system 1100 can include one or more containers 102. For instance, a vehicle can include a first container on a driver side and a second container on the passenger side, wherein the first container and the second container are horizontal in comparison to the ground and at a level at or below the chassis of the vehicle. In a particular embodiment, a weight element can be used as a counterweight or a counterbalance in the event that a configuration of containers is used that requires balancing—for instance when a first container is used on one side but a second container is not on the opposite side. In such instance, a side can be configured to house a weight element that counterbalances a portion of weight associated with the container on the opposite side.

The support system 1100 can include tubing that delivers the material from the container 102 to a manifold, an engine, or a portion of an engine of the vehicle, wherein the tubing can utilize one or more filters, connectors, valves, regulators, and the like.

The support system 1100 can utilize a shock mount, wherein the shock mount can be, but is not limited to being, a elastomeric damper, a spring-damper, and the like. The shock mount can include a damper with an aperture in which a bolt can be inserted therein, wherein the bolt can attach a bracket assembly to the chassis of the vehicle. The shock mount can further include a washer or plate on an end with a nut that facilitates attachment to the chassis. In a horizontal orientation, the shock mount can include a mounting bracket which attaches bracket assembly to the chassis of the vehicle and also to the shock mount. The shock mount includes the damper that mitigates impact or shock since it is between the bracket assembly and the chassis of the vehicle.

In an embodiment, the support system can include a draw line having a first end and a second end, the first end is coupled to the second end of the container via a second valve, wherein the second valve is configured to allow flow of the compressed gas out of the container. In an embodiment, the support system can further include a valve within the first receptacle and wherein the valve, the first valve, and the second valve are one-way valves. In an embodiment, the support system can include a manifold that receives the compressed gas from the second valve prior to delivery to an engine via the second end of the draw line.

In an embodiment, the support system can include: a second receptacle that is positioned through the housing, the second receptacle is configured to receive at least one of the compressed gas or a nozzle that dispenses the compressed gas at a second rate of flow; and a second cap that is configured to removeably mate with the second receptacle. In an embodiment, the support system can include the second receptacle is coupled to a portion of the fill line via a port, wherein the port is configured to provide fluid communication to allow flow of the compressed gas into the container via the fill line. In an embodiment, the support system can include a second fill line having a first end and a second end, the second end is coupled to the second receptacle and the first end is coupled to the first end of the container to allow flow of the compressed gas into the container at the second rate of flow. In an embodiment, the support system can include the first rate of flow is greater than the second rate of flow.

In an embodiment, the support system can include: a first inner plate coupled to the first neck mount located at the first end; a second inner plate coupled to the second neck mount located at the second end; the first inner plate and the second inner plate are coupled to an inside wall of the housing; a truss assembly coupled to a front side of the first inner plate; and the first inner plate, the second inner plate, and the truss assembly being encased within the housing.

In an embodiment, the support system can include the member of the bracket assembly is positioned above the coupling member. In an embodiment, the support system can include the member of the bracket assembly is positioned below the coupling member.

In an embodiment, the support system can include a pressure release device located on the second end of the container that is configured to release pressure from the container based on a parameter. In an embodiment, the support system can include the container is cylindrical in shape and the housing is cylindrical in shape.

In an embodiment, the support system can include a proximity sensor incorporated into or coupled with the first cap that is configured to communicate a signal to alert when the first cap is disconnected from the first receptacle.

In an embodiment, the storage system can include the material is at least one of compressed natural gas or a compressed hydrogen. In an embodiment, the storage system can include a bracket assembly that couples to the frame of the vehicle and supports a portion of the housing.

In an embodiment, the storage system can include: a second receptacle that is positioned through the housing, the second receptacle is configured to receive at least one of the compressed gas or a nozzle that dispenses the compressed gas at a second rate of flow, wherein the first rate of flow is greater than the second rate of flow; and a second cap that is configured to removeably mate with the second receptacle.

In an embodiment, the storage system can include: the second receptacle is coupled to a portion of the fill line via a port, wherein the port is configured to provide fluid communication to allow flow of the compressed gas into the container via the fill line; or a second fill line having a first end and a second end, the second end is coupled to the second receptacle and the first end is coupled to the first end of the container to allow flow of the compressed gas into the container at the second rate of flow.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the subject matter, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. An integrated fill system for a container housing a material used as a fuel source for a vehicle, comprising:
    a container configured to house a compressed gas, the container has a first end and a second end opposite thereto;
    a threaded male portion on the first end that is coupled to a female portion on a first neck mount, wherein the threaded male portion mates with the female portion;
    the second end inserted into a second neck mount to enable movement based on a pressure change or a temperature change;
    a housing configured to encase the container, the first neck mount, the second neck mount;
    a fill line having a first end and a second end, the first end is coupled to the first end of the container via a first valve, wherein the first valve is configured to allow flow of the compressed gas into the container;
    a first receptacle that is coupled to the second end of the fill line and positioned through the housing, the first receptacle is configured to receive at least one of the compressed gas or a nozzle that dispenses the compressed gas at a first rate of flow into the container; and
    a first cap that is configured to removeably mate with the first receptacle.

2. The integrated fill system of claim 1, further comprising a draw line having a first end and a second end, the first end is coupled to the second end of the container via a second valve, wherein the second valve is configured to allow flow of the compressed gas out of the container.

3. The integrated fill system of claim 2, further comprising:
    a valve within the receptacle; and
    the first valve, the second valve, and the valve are one-way valves.

4. The integrated fill system of claim 2, further comprising a manifold that receives the compressed gas from the second valve prior to delivery to an engine of the vehicle via the second end of the draw line.

5. The integrated fill system of claim 1, further comprising:
    a second receptacle that is positioned through the housing, the second receptacle is configured to receive at least one of the compressed gas or a nozzle that dispenses the compressed gas at a second rate of flow; and
    a second cap that is configured to removeably mate with the second receptacle.

6. The integrated fill system of claim 5, the second receptacle is coupled to a portion of the fill line via a port, wherein the port is configured to provide fluid communication to allow flow of the compressed gas into the container via the fill line.

7. The integrated fill system of claim 5, further comprising a second fill line having a first end and a second end, the second end is coupled to the second receptacle and the first end is coupled to the first end of the container to allow flow of the compressed gas into the container at the second rate of flow.

8. The integrated fill system of claim 5, the first rate of flow is greater than the second rate of flow.

9. The integrated fill system of claim 1, further comprising the housing is configured to releasably couple to a portion of a frame of the vehicle.

10. The integrated fill system of claim 1, the housing is configured to releasably couple to a portion of the vehicle in a horizontal orientation compared to a ground level.

11. The integrated fill system of claim 1, the housing is configured to releasably couple to a portion of the vehicle in a vertical orientation compared to a ground level.

12. The integrated fill system of claim 1, further comprising a pressure release device located on the second end of the container that is configured to release pressure from the container based on a parameter.

13. The integrated fill system of claim 1, the container is cylindrical in shape and the housing is cylindrical in shape.

14. The integrated fill system of claim 1, further comprising a proximity sensor incorporated into or coupled with the first cap that is configured to communicate a signal to alert when the first cap is disconnected from the first receptacle.

15. A fuel storage system for a vehicle, comprising:
a housing having a first end and a second end opposite the first end and a thickness, the housing having a length between the first end and the second end;
a container situated within the housing, the container houses a material, the container has a first end and a second end opposite thereto;
the housing is configured to be coupled to a frame of a vehicle;
a fill line having a first end and a second end, the first end is coupled to the first end of the container via a first valve, wherein the first valve is configured to allow flow of the compressed gas into the container; and
a first receptacle that is coupled to the second end of the fill line and positioned through the housing, the receptacle is configured to receive at least one of the compressed gas or a nozzle that dispenses the compressed gas at a first rate of flow.

16. The fuel storage system of claim 15, wherein the material is at least one of compressed natural gas or a compressed hydrogen.

17. The fuel storage system of claim 15, further comprising a bracket assembly that couples to the frame of the vehicle and supports a portion of the housing.

18. The fuel storage system for a vehicle of claim 15, further comprising:
a second receptacle that is positioned through the housing, the second receptacle is configured to receive at least one of the compressed gas or a nozzle that dispenses the compressed gas at a second rate of flow, wherein the first rate of flow is greater than the second rate of flow; and
a second cap that is configured to removeably mate with the second receptacle.

19. The fuel storage system for a vehicle of claim 18, further comprising:
the second receptacle is coupled to a portion of the fill line via a port, wherein the port is configured to provide fluid communication to allow flow of the compressed gas into the container via the fill line; or
a second fill line having a first end and a second end, the second end is coupled to the second receptacle and the first end is coupled to the first end of the container to allow flow of the compressed gas into the container at the second rate of flow.

20. An integrated fill system for a container housing a material used as a fuel source for a vehicle, comprising:
a housing having a first end and a second end opposite the first end and a thickness, the housing having a length between the first end and the second end;
a container having a cylindrical shape, the container houses a material, the container has a first end and a second end opposite thereto;
the housing configured to provide protection and enclose the container;
one or more bracket assemblies, wherein each bracket assembly includes a coupling member that couples to a portion of the vehicle and a member that is coupled or supports exterior portion of the housing;
a fill line having a first end and a second end, the first end is coupled to the first end of the container via a first valve, wherein the first valve is configured to allow flow of the compressed gas into the container; and
a first receptacle that is coupled to the second end of the fill line and positioned through the housing, the receptacle is configured to receive at least one of the compressed gas or a nozzle that dispenses the compressed gas at a first rate of flow into the container.

* * * * *